(12) United States Patent
Bui et al.

(10) Patent No.: US 12,188,900 B2
(45) Date of Patent: Jan. 7, 2025

(54) SYSTEM AND METHOD FOR MEASURMENT OF MAGNETIC NANOPARTICLES

(71) Applicant: Government of the United States of America, as represented by the Secretary of Commerce, Gaithersburg, MD (US)

(72) Inventors: Thinh Quoc Bui, Kensington, MD (US); Solomon Isaac Woods, Kensington, MD (US); Weston Leo Tew, Jr., Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 409 days.

(21) Appl. No.: 17/669,992

(22) Filed: Feb. 11, 2022

(65) Prior Publication Data
US 2022/0252546 A1   Aug. 11, 2022

Related U.S. Application Data

(60) Provisional application No. 63/148,376, filed on Feb. 11, 2021.

(51) Int. Cl.
*G01N 27/72* (2006.01)
*G01K 1/02* (2021.01)
*G01K 7/16* (2006.01)

(52) U.S. Cl.
CPC ............. *G01N 27/72* (2013.01); *G01K 1/026* (2013.01); *G01K 7/16* (2013.01)

(58) Field of Classification Search
CPC ............. G01N 35/10; G01N 35/00732; G01N 33/5005; G01N 2035/00237
See application file for complete search history.

(56) References Cited

U.S. PATENT DOCUMENTS 10,634,742 B2    4/2020  Garraud et al.
2010/0308822 A1* 12/2010  Prado .................. G01R 33/448
                                                            324/309

(Continued)

OTHER PUBLICATIONS

Tay, Z.W., et al., "A High-Throughput, Arbitrary- Waveform, MPI Spectrometer and Relaxometer for Comprehensive Magnetic Particle Optimization and Characterization", Scientific Reports, 2016, p. 34180, vol. 6.
Zhong, J., et al., "Influence of static magnetic field strength on the temperature resolution of a magnetic nanoparticle thermometer", Journal of Applied Physics, 2016, p. 143902, vol. 120.
Riordan, E., et al., "Design and implementation of a low temperature, inductance based high frequency alternating current susceptometer", Review of Scientific Instruments, 2019, p. 073908, vol. 90.
Magnetic Particle Spectrometer, Pure Devices (Germany), Accessed Feb. 10, 2022, DOI: https://pure-devices.com/images/Flyer/Flyer_MPS_web.pdf.

(Continued)

*Primary Examiner* — Jermele M Hollington
*Assistant Examiner* — Temilade S Rhodes-Vivour
(74) *Attorney, Agent, or Firm* — Office of Chief Counsel for National Institute of Standards and Technology

(57) ABSTRACT

Embodiments of the present invention relate to a system and method for performing temperature-dependent measurements of a magnetic nanoparticle sample. The system includes high frequency coils and sample temperature tunable assembly to determine the specific relaxation process for magnetic nanoparticle sample using both time and frequency domain techniques. During the temperature-dependent measurements of a magnetic nanoparticle sample, system in accordance with embodiments of the present invention resolve the nanoparticle dynamics using a temperature-tunable dual mode, AC susceptibility and magnetic relaxometry, to cover a broad range of frequencies and time scales. Other operational modes of the invention can drive the nanoparticles with arbitrary waveforms (sinusoidal, sum of sinusoids, or repeated pulses) to elicit and measure (Continued)

tailored response behavior from the magnetic nanoparticle sample.

20 Claims, 19 Drawing Sheets

(56) References Cited

U.S. PATENT DOCUMENTS

2011/0098558 A1\* 4/2011 Weaver .............. G01R 33/4808
 600/420
2012/0035458 A1\* 2/2012 Flynn ................. G01R 33/0354
 600/431

OTHER PUBLICATIONS

RELAX: Particle Relaxometry Module, Magnetic Insight, Accessed Feb. 10, 2022, DOI: https://www.magneticinsight.com/wp-content/uploads/2019/12/WP_RELAX_1219_V1.pdf.
AC Susceptibilty (ACMS II), Quantum Design, Accessed Feb. 10, 2022, DOI: https://qdusa.com/siteDocs/productBrochures/1084-500_PPMS_ACMS_II.pdf.
DynoMag AC Susceptometer, Quantum Design, Accessed Feb. 10, 2022, DOI: https://qdusa.com/products/rise_dynomag.html.

\* cited by examiner (A)

(B)

SYSTEM AND METHOD FOR MEASURMENT OF MAGNETIC NANOPARTICLES

CROSS-REFERENCE TO RELATED APPLICATION

This application claims the benefit of priority from U.S. Provisional Patent Application Ser. No. 63/148,376, filed on Feb. 11, 2021, the disclosure of which is incorporated herein by reference.

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to characterization of magnetic nanoparticles, and more particularly, to a system and method for temperature-dependent magnetic measurements of magnetic nanoparticles.

BACKGROUND OF THE INVENTION

Magnetic characterization of the dynamic properties of magnetic nanoparticles (MNPs) is an emerging field with applications ranging from material science to medicine. Direct current (DC) and alternating current (AC) magnetometry techniques are utilized for understanding MNPs' intrinsic and extrinsic properties toward optimizing nanoparticle response for applications in biomedicine, magnetic memory, ferrofluids, and other fundamental interests. The dynamic response of MNPs in magnetic fields depends on the particles' inherent properties, inter-particle interactions, as well as the environment in which they are suspended, and thus, a comprehensive understanding of these effects requires high sensitivity over a broad parameter space. One important subset of AC magnetometry is magnetic particle spectroscopy (MPS), which was developed to determine the spectral response of MNPs used in magnetic particle imaging (MPI), but has also been used in MNP thermometry.

An underdeveloped application using MNPs is non-invasive and remote thermometry. Remote temperature measurement is important in biology and medicine, and other areas such as 3D printing, heat exchangers, and chemical synthesis. MNP thermometry relies on the temperature dependence of magnetization M(T) and it is desirable that the magnetization displays a strong temperature dependence for improved sensitivity such that the derivative $(1/M)dM(T)/dT$ is as large as possible.

MPS has been used for AC magnetometry-based MNP thermometry. In contrast to DC magnetometry-based MNP thermometry, AC drive fields interrogate the frequency-dependent dynamics that give rise to the observed magnetization signal. The dynamics of MNP magnetization may be described in terms of two magnetic relaxation models, Néel and Brownian relaxations. These dynamics originate from a combination of intrinsic properties of MNPs (e.g., anisotropy) and effects of their environment (e.g., viscosity, solvent, inter-particle interactions); both factors have functional dependence on temperature.

Successful application of AC magnetometry for MNP thermometry demands both high fidelity quantitative measurements and quantification of metrics for stability, especially in the context of the precision and accuracy of MNP magnetization measurements. To be a viable thermometer, a key metric is that the measured intrinsic magnetization of MNPs must be reproducible and independent of environmental conditions. In contrast to measurement of the full harmonic spectrum in MPS for magnetic particle imaging, MNP thermometry typically requires the use of only two harmonics at a time. A typical complication for quantitative MPS for AC magnetometry, thermometry, and imaging is the presence of the feedthrough (drive) signal at the detector, which can obfuscate the small MNP signal. A conventional approach to address this is to include a gradiometer configuration for passive feedthrough subtraction on the order of about 60 dB, or electronic filtering of the feedthrough signal, which suppresses the first harmonic signal by about 110 dB. Another technique is to combine passive and active cancelation for broadband feedthrough suppression.

Accordingly, there is a need for an improved system and method for accurate measurement of temperature-dependent magnetization for a magnetic nanoparticle-based thermometer. There is also a need for a real-time MPS with a drive field stability at the parts-per-million level and suppression of the feedthrough signal's first and third harmonics by 120 dB, limited only by the detector noise floor.

SUMMARY OF THE INVENTION

Embodiments of the present invention provide a system and method for measurement of temperature-dependent magnetization for a magnetic nanoparticle-based thermometer.

An embodiment of the present invention relates to an apparatus for measuring a magnetic nanoparticle sample, including a sample stage for receiving a magnetic nanoparticle sample, wherein the sample stage comprises an outer sample stage assembly encasing an inner sample stage assembly, wherein the inner sample stage assembly comprises a first sensor region and a second sensor region separated by a predetermined distance, wherein the first sensor region comprises a cavity for receiving a sample holder containing the magnetic nanoparticle sample; a heat transfer unit coupled to the sample stage for heating the magnetic nanoparticle sample to a predetermined temperature, wherein the heat transfer unit is coupled to a conduit positioned on the sample stage for transporting a heat transfer fluid through the sample stage; a plurality of temperature sensors positioned on the sample stage for monitoring the temperature of the magnetic nanoparticle sample; an electrical power source configured to generate a high-frequency alternating current; a drive coil coupled to the electrical power source to generate a magnetic field for application to the magnetic nanoparticle sample, wherein the drive coil is wound around the outer sample stage assembly to encase the first sensor region and the second sensor region, wherein an inductance of the drive coil is set to a predetermined inductance value such that the drive coil is capable of receiving the high-frequency alternating current; a sample sensor positioned at the first sensor region to detect a magnetic response of the magnetic nanoparticle sample, wherein the magnetic response comprises an induced voltage generated in response to the magnetic field applied by the drive coil and the temperature of the magnetic nanoparticle sample; a magnetic field sensor positioned at the second sensor region to detect the magnetic field generated by the drive coil; a receive circuit for receiving the induced voltage generated in response to the magnetic field applied by the drive coil and the temperature of the magnetic nanoparticle sample and generating an amplified and filtered induced voltage data; a digitizer for digitizing the amplified and filtered induced voltage data; and a processor for processing the digitized data to determine AC susceptibility and magnetic relaxometry signals of the magnetic nanoparticle sample and to determine intrinsic properties of the magnetic nanoparticles from the magnetic response. More particularly, the drive coil is a solenoid coil and the inductance of the drive coil is about 1 pH and the resistance of the drive coil is about 1 ohm.

In one embodiment of the present invention, the electrical power source is a high voltage power supply coupled to a capacitor circuit, a waveform generator, high voltage switch and a high voltage power supply to generate the high-frequency alternating current having a pulsed waveform, wherein the alternating current has a pulse rise time of about 20 ns In another embodiment of the present invention, the electrical power source is a waveform generator coupled to a high-frequency current amplifier to generate a high-frequency alternating current having an arbitrary waveform, wherein the alternating current has plurality of sinusoidal components having a frequency from about 1 kHz to about 50 MHz.

In one embodiment of the present invention, the first and second inductive coils are wound around the inner sample stage assembly as a first order gradiometer.

In an exemplary embodiment of the present invention, the magnetic field sensor and the sample sensor are separated by about 10 mm.

Embodiments in accordance with the present invention can further include a controller comprising: a digital lock-in amplifier to measure a first amplitude and a first phase of a first and third harmonic of the magnetic field detected by magnetic field sensor, a feedback loop filter for applying the first amplitude of the first harmonic to stabilize the magnetic field generated by the drive coil to a predetermined value, and a feedforward lock for subtracting the first and the third harmonic of the magnetic field detected by magnetic field sensor from the magnetic response detected by the sample sensor. More particularly, the feedforward lock for subtracting the first and the third harmonic of the magnetic field detected by the magnetic field sensor from the magnetic response detected by the sample sensor comprises: a drive field stabilization feedback lock for comparing the first amplitude of the first harmonic of the magnetic field detected by the magnetic field sensor to a first set point value to generate an error signal; a first function generator for applying the error signal to the first amplitude of the first harmonic to stabilize the first harmonic amplitude to a second set point value; a processor for determining a correction signal from the first amplitude and the first phase of the first and the third harmonic of the magnetic field detected by the magnetic field sensor; a second function generator for generating a second amplitude and a second phase for the first and the third harmonic of the magnetic field detected by the magnetic field sensor, wherein the second amplitude and the second phase are determined from the correction signal determined by the processor; a summer to combine the second amplitude and the second phase for the first and the third harmonic of the magnetic field detected by the magnetic field sensor; a preamplifier for receiving a first signal comprising the combined second amplitude and the second phase for the first and the third harmonic of the magnetic field detected by the magnetic field sensor and a second signal comprising the magnetic response detected by the sample sensor, wherein the preamplifier receives the first signal in a first channel and the second signal in a second channel, wherein the preamplifier generates a differential output of the first and second signals, wherein the generating the differential output comprises subtracting the first and the third harmonic of the magnetic field detected by the magnetic field sensor from the magnetic response detected by the sample sensor; and a digitizer for digitizing the differential output generated by the preamplifier.

In one embodiment of the present invention, the sample stage is non-magnetic, and wherein the sample stage has a thermal conductivity above a predetermined value. In one example of the present invention, the sample stage is fabricated using aluminum nitride/boron nitride.

In some embodiments of the present invention, each of the plurality of the temperature sensors is a resistance thermometer.

Another embodiment of the present invention relates an apparatus for measuring a magnetic nanoparticle sample, including: a sample stage for receiving the magnetic nanoparticle sample, wherein the sample stage comprises an outer sample stage assembly encasing an inner sample stage assembly, wherein the inner sample stage assembly comprises a first sensor region and a second sensor region separated by a predetermined distance, wherein the first sensor region comprises a cavity for receiving a sample holder containing the magnetic nanoparticle sample; a heat transfer unit coupled to the sample stage for heating the magnetic nanoparticle sample to a predetermined temperature, wherein the heat transfer unit is coupled to a conduit positioned on the sample stage for transporting a heat transfer fluid through the sample stage; a plurality of temperature sensors positioned on the sample stage for monitoring the temperature of the first sensor region; an electrical power source configured to generate a high-frequency alternating current having a pulsed waveform; a drive coil coupled to the electrical power source to generate a magnetic field for application to the magnetic nanoparticle sample, wherein the drive coil is wound around the outer sample stage assembly in a region encasing the first sensor region and the second sensor region, wherein an inductance and resistance of the drive coil is set to predetermined values such that the drive coil is capable of receiving the high-frequency alternating current; a first inductive coil positioned at the first sensor region to detect a magnetization change to the magnetic nanoparticle sample based on the magnetic field applied by the drive coil and the temperature of the magnetic nanoparticle sample, wherein the magnetization change to the magnetic nanoparticle comprises an induced voltage generated in response to the magnetic field applied by the drive coil and the temperature of the magnetic nanoparticle sample; a second inductive coil positioned at the second sensor region to detect the magnetic field generated by the drive coil; a receive circuit for receiving the induced voltage generated in response to the magnetic field applied by the drive coil and the temperature of the magnetic nanoparticle sample and generating an amplified and filtered induced voltage data; a digitizer for digitizing the amplified and filtered induced voltage data; and a processor for processing the digitized data to determine AC susceptibility and magnetic relaxometry signals of the magnetic nanoparticle sample and to determine intrinsic properties of the magnetic nanoparticles from the magnetic response. More particularly, the electrical power source is configured to generate a high-frequency alternating current having a pulse rise time of about 20 ns.

In one embodiment of the present invention, the first and the second induction coils are separated by about 10 mm. In another embodiment of the present invention, the inductance of the drive coil is about 1 µH and the resistance of the drive coil is about 1 ohm.

Embodiments of the present invention also relate to an apparatus for measuring a magnetic nanoparticle sample, including: an inner sample stage assembly for receiving the magnetic nanoparticle sample, wherein the inner sample stage assembly comprises a first sensor region and a second sensor region separated by a predetermined distance, wherein the first sensor region comprises a cavity for receiving a sample holder containing the magnetic nanoparticle sample; an outer sample stage assembly encasing the first and second sensor regions of the inner sample stage assembly; a heat transfer unit coupled to the inner sample stage assembly for heating the magnetic nanoparticle sample at a predetermined temperature, wherein the heat transfer unit is coupled to a conduit positioned on the sample stage for transporting a heat transfer fluid through the sample stage; a plurality of temperature sensors positioned on the inner sample stage assembly for monitoring the temperature of the first sensor region; an electrical power source configured to generate a high-frequency alternating current; a drive coil coupled to the electrical source to generate a magnetic field for application to a magnetic nanoparticle sample, wherein the drive coil is wound around the drive coil region of the outer sample stage assembly, wherein an inductance and resistance of the drive coil is set to predetermined values such that the drive coil is capable of receiving the high-frequency alternating current; a sample sensor for detecting a magnetic response of the magnetic nanoparticle sample comprising a first inductive coil wound around the first sensor region of the inner sample stage assembly, wherein the magnetic response comprises an induced voltage generated in response to the magnetic field and the temperature of the magnetic nanoparticle sample; a magnetic field for detecting the magnetic field generated by the drive coil, wherein the magenetic field sensor comprises a second inductive coil wound around the second sensor region of the inner sample stage assembly; a receive circuit for receiving the induced voltage generated in response to the magnetic field applied by the drive coil and the temperature of the magnetic nanoparticle sample and generating an amplified and filtered induced voltage data; a controller comprising: a digital lock-in amplifier to measure a first amplitude and a first phase of a first and third harmonic of the magnetic field detected by magnetic field sensor, a feedback loop filter for applying the first amplitude of the first harmonic to stabilize the magnetic field generated by the drive coil to a predetermined value, and a feedforward lock for subtracting the first and the third harmonic of the magnetic field detected by magnetic field sensor from the magnetic response detected by the sample sensor; a digitizer for digitizing the amplified and filtered differential output generated by the preamplifier; and a processor for processing the digitized data to determine AC susceptibility and magnetic relaxometry signals of the magnetic nanoparticle sample and to determine intrinsic properties of the magnetic nanoparticles from the magnetic response.

In one embodiment of the present invention, the electrical power source is configured to generate the high-frequency alternating current having a pulsed waveform or an arbitrary waveform.

In some embodiments of the present invention, the inductance of the drive coil is about 1 µH and the resistance of the drive coil is about 1 ohm, and wherein the first and the second induction coils are separated by about 10 mm.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Figure 1:
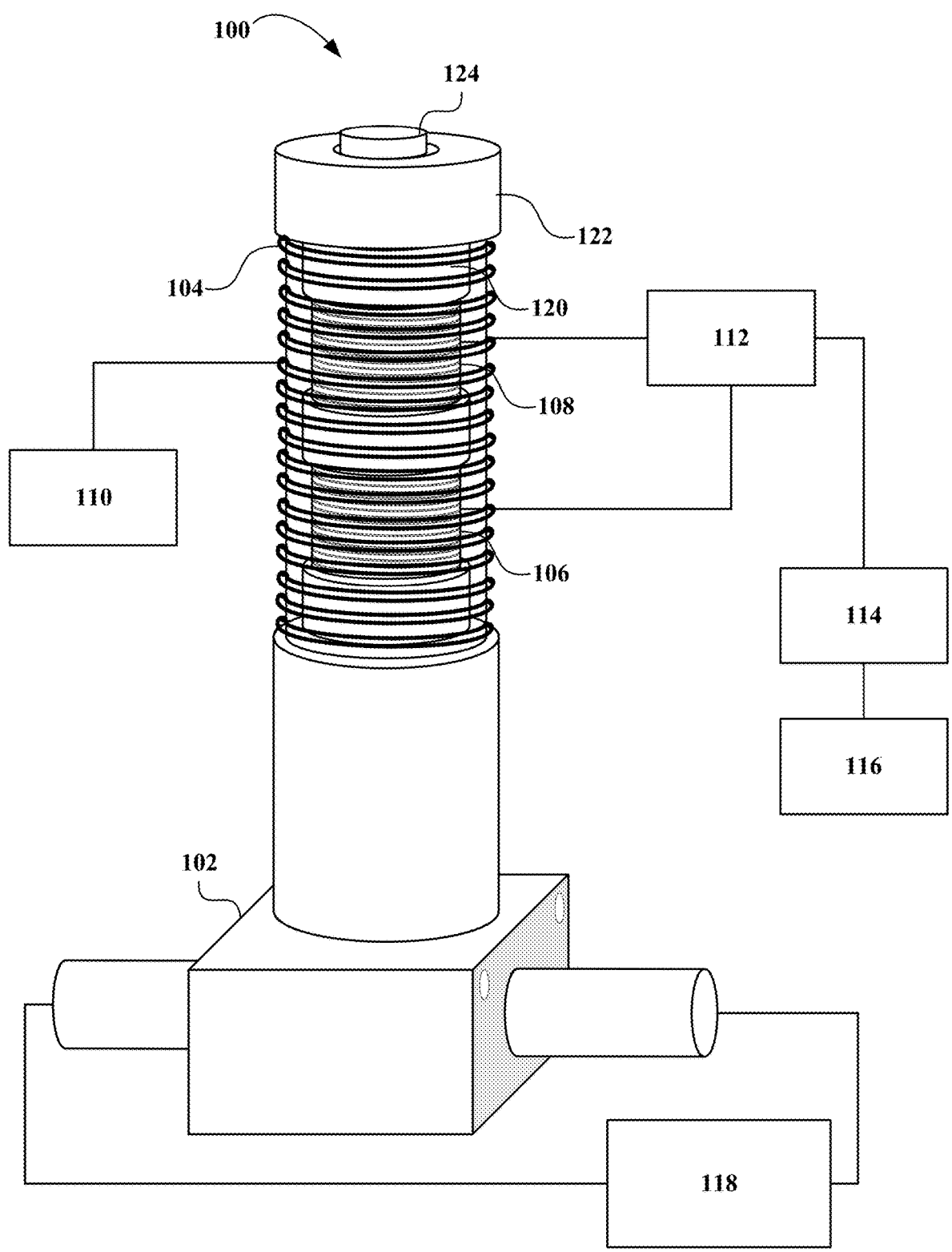
FIG. 1 illustrates an apparatus in accordance with an embodiment of the present invention for measurement of magnetic nanoparticle samples.

Referring now to the drawings, and more particularly, to FIG. 1, there is shown an apparatus, generally referred to as magnetic nanoparticle spectrometer and designated 100 and schematically showing an embodiment of the present invention, for performing temperature-dependent measurements of a magnetic nanoparticle sample. Magnetic nanoparticle spectrometer 100 includes a sample stage 102 for holding a magnetic nanoparticle sample and thermally isolating the sample from the environment without the use of vacuum, a drive coil assembly 104 for generating magnetic fields, a magnetic field sensor 106 for measuring the magnetic field generated by drive coil assembly 104, a sample sensor 108 for measuring a magnetic response of the magnetic nanoparticle sample to the magnetic field generated by drive coil assembly 104, electrical power source 110, a receive circuit 112 for electronically processing (summing, amplyfying, and filtering) induced voltage from sensors 106 and 108 and filtering data for processing, a digitizer 114 for digitizing an output generated by receive circuit 112, a processor 116 for processing data generated by receive circuit 112 and digitized by digitizer 114, and a heat transfer unit 118 for heating and maintaining the temperature of sample stage 102 at a predetermined value. Exemplary MNPs that can be used in MPS 100 in accordance with an embodiment of the present invention include 5 mg Fe/mL in 50 μL (Ocean Nanotech SHP15), 5 mg Fe/mL in 300 μL (Ocean Nanotech SHP15), 5 mg Fe/mL in 50 μL (Vivotrax™), 5 mg Fe/mL in 300 μL (Vivotrax™), 10 mg Fe/mL in 50 μL (50 nm Micromod Synomag), 10 mg Fe/mL in 300 μl (50 nm Micromod Synomag), and the like.

Figure 2:
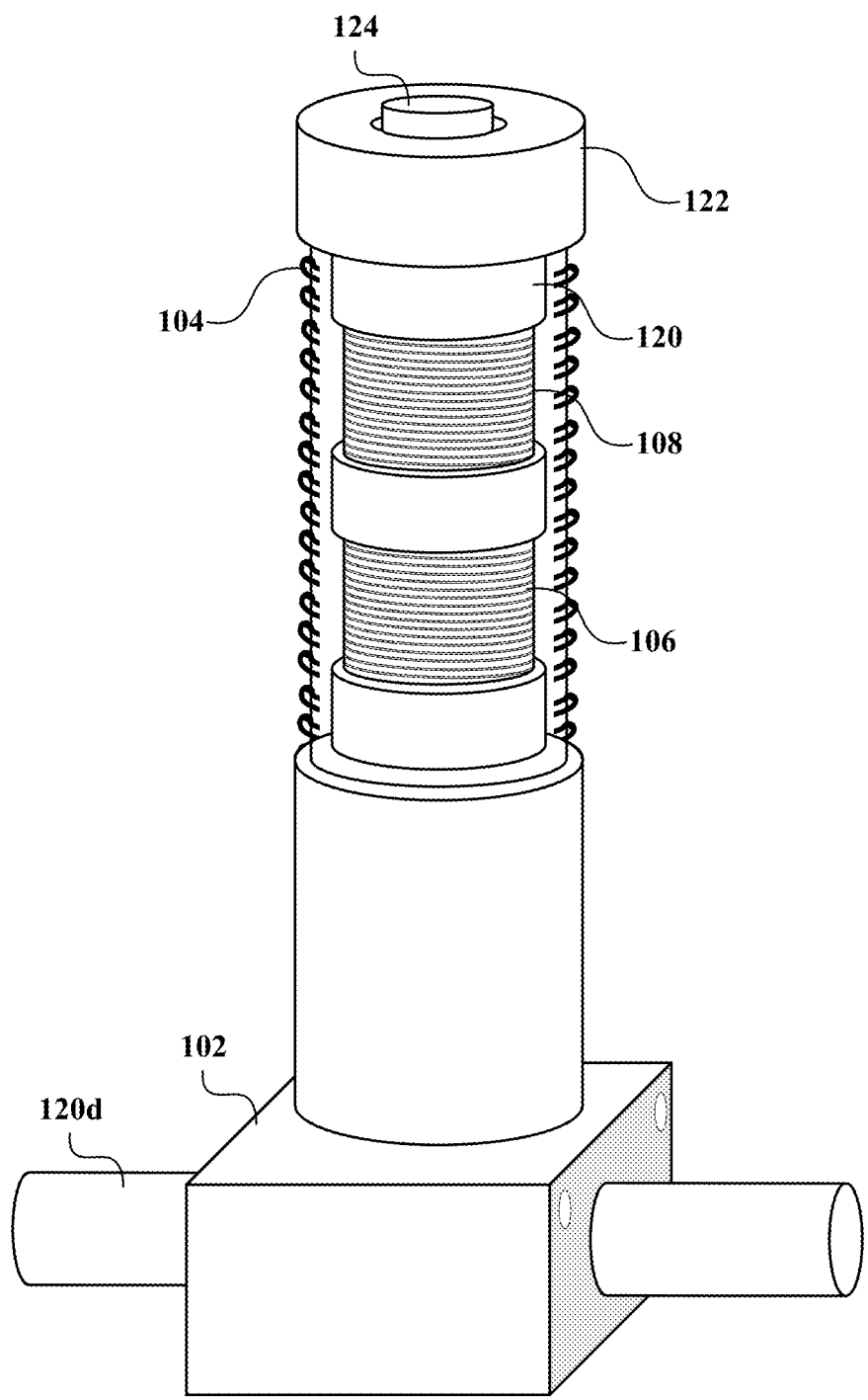
FIG. 2 illustrates an alternative view of an apparatus in accordance with an embodiment of the present invention for measurement of magnetic nanoparticle samples.
Figure 3:
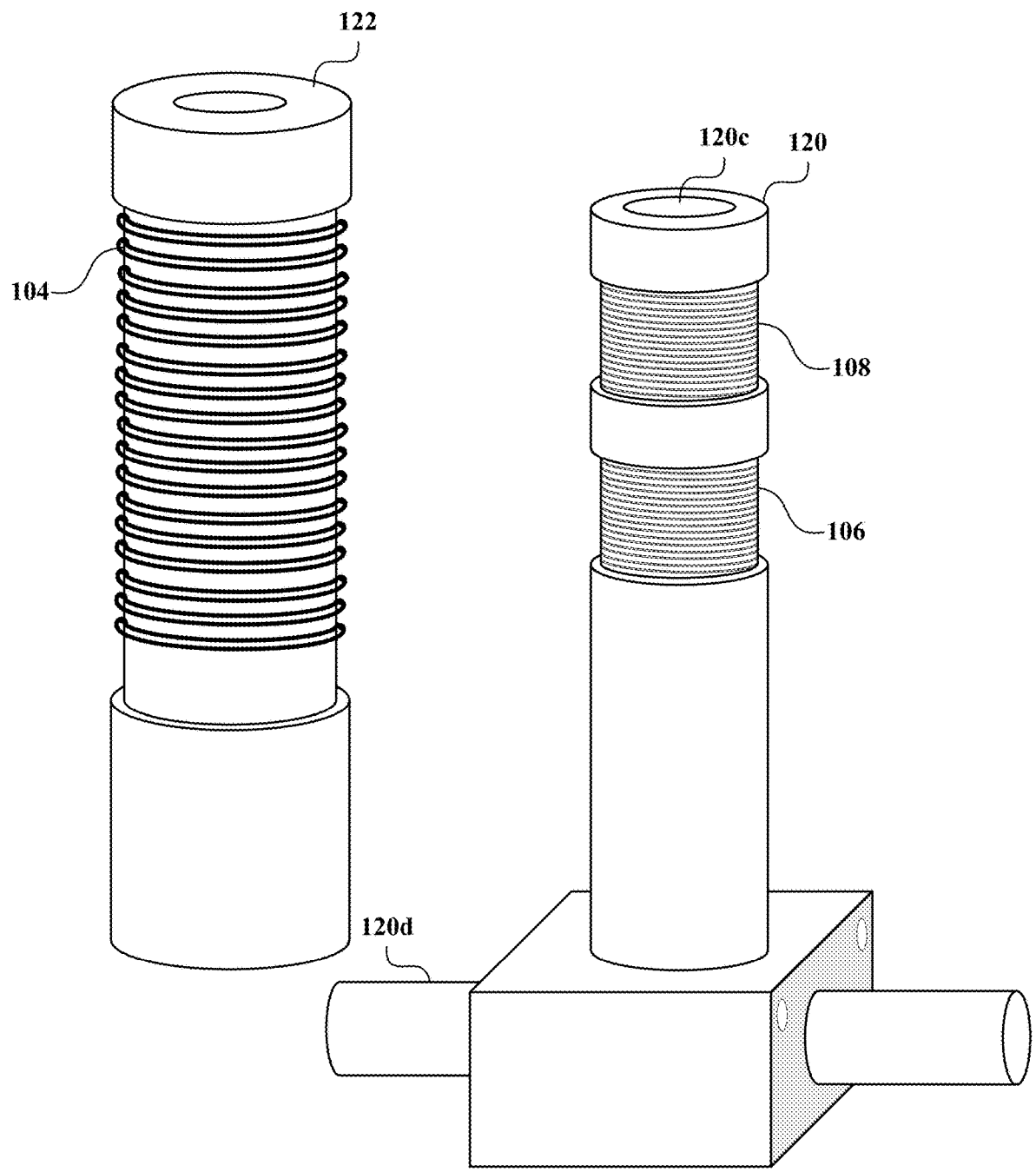
FIG. 3 illustrates an outer sample stage assembly and inner sample stage assembly of an apparatus in accordance with an embodiment of the present invention showing.
Figure 4:
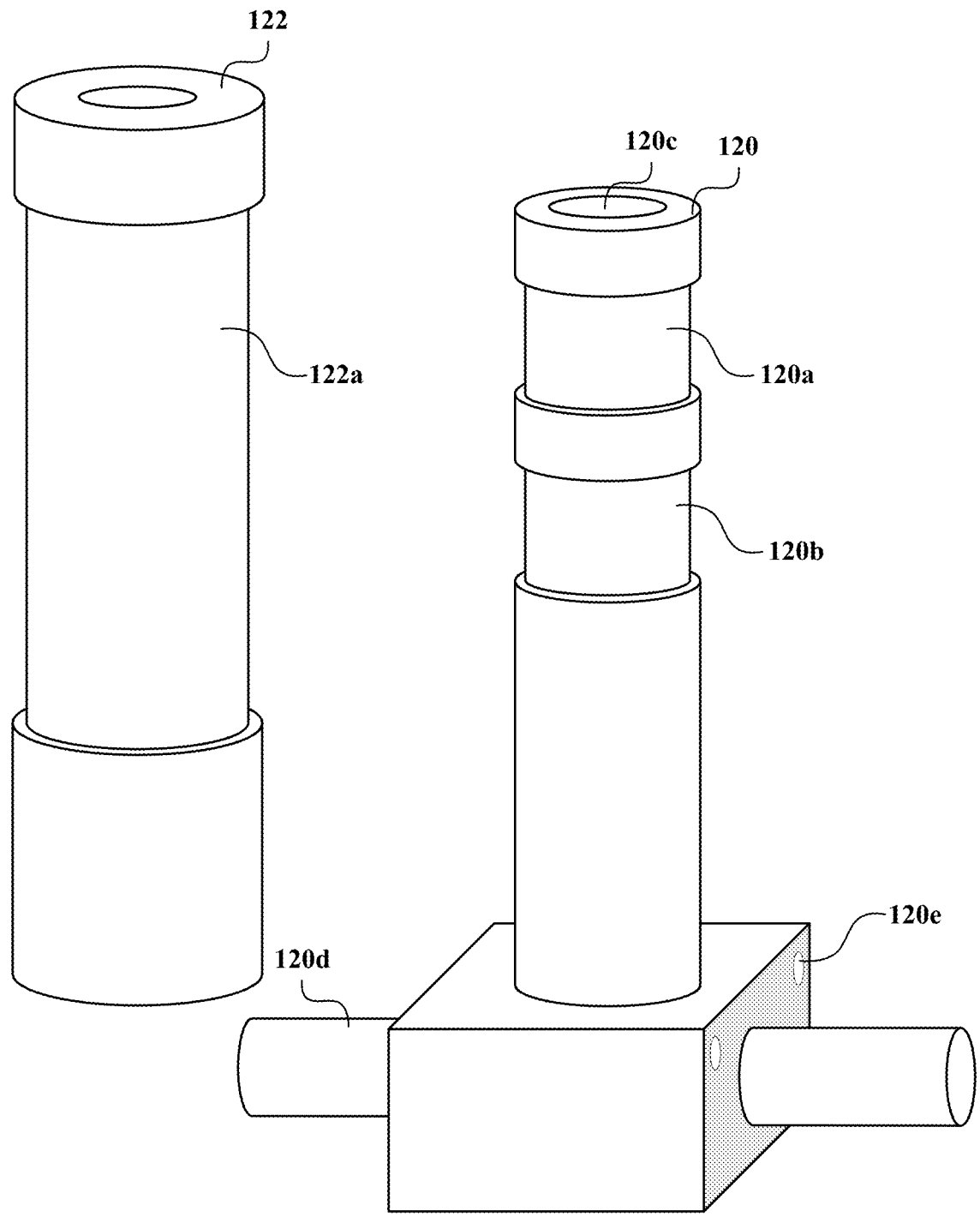
FIG. 4 illustrates an alternate perspective of outer sample stage assembly and inner sample stage assembly an apparatus in accordance with an embodiment of the present invention showing.

Sample stage 102 for holding the MNP sample includes an inner sample holder assembly 120 and an outer sample mount 122, as shown in FIGS. 1, 2, 3 and 4. Inner sample stage assembly 120 includes an upper sensor region 120a capable of receiving sample sensor 108 and a lower sensor region 120b capable of receiving magnetic field sensor 106, as shown in FIG. 4. A thickness of inner sample stage assembly 120 is selected to maximize the sensitivity to the magnetic nanoparticle sample by sample sensor 108. Upper sensor region 120a and lower sensor region 120b are separated by a predetermined distance along the longitudinal axis of sample holder 102. In one embodiment of the present invention, upper sensor region 120a and lower sensor region 120b are separated by about 10 mm. Sample stage 102 may be made using ceramic material that is non-magnetic and has high thermal conductivity. Exemplary material that can used for the fabrication of sample stage 102 include aluminum nitride/boron nitride (e.g., Shapal Hi-M Soft™).

Figure 5:
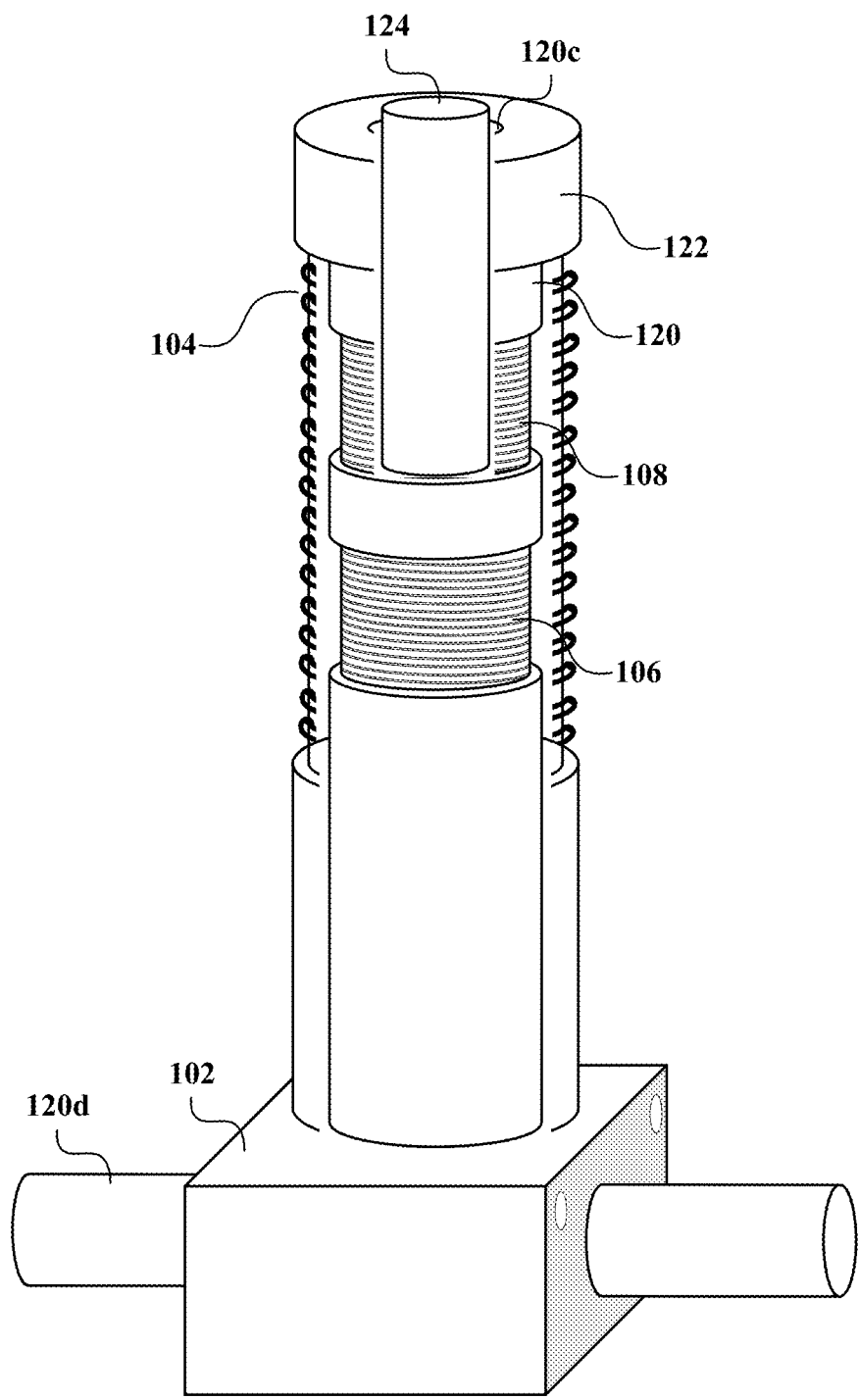
FIG. 5 illustrates a partial cross-sectional view of an apparatus in accordance with an embodiment of the present invention.

Inner sample stage assembly 120 further includes a sample cavity 120c positioned in upper sensor region 120a for receiving a sample holder 124 containing MNP sample such that sample holder 124 is positioned inside sample sensor 108, as shown in FIG. 5. Exemplary sample holder 124 that can be positioned in sample cavity 120c is a sapphire crucible. In an exemplary embodiment of the present invention, inner sample stage assembly 120 has a length of about 42 mm and an outer diameter of about 20 mm with each of sensor regions 120a-b having a length of about 15 mm and an outer diameter of about 15 mm and separated by about 10 mm.

Inner sample holder assembly 120 is enclosed by outer sample stage assembly 122 to isolate inner sample stage assembly 120 from ambient conditions without the use of vacuum. Outer sample stage assembly 122 forms a sheath around inner sample stage assembly 120 and serves as a form for drive coil assembly 104, as shown in FIGS. 1 and 2. Outer sample stage assembly 122 includes a coil region 122a on its surface, as shown in FIG. 4, spanning from about region encasing magnetic field sensor 106 to about region encasing sample sensor 108, for receiving drive coil assembly 104. In one embodiment of the present invention, outer sample stage assembly 122 has the dimensions of about 25.4×25.4×60 mm$^3$.

Temperature of inner sample stage assembly 120 is controlled by heat transfer unit 118 coupled to conduits 120d positioned at the base of inner sample stage assembly 120. Conduits 120d are coupled to heat transfer unit 118 for circulating a heat transfer fluid through inner sample stage assembly 120. In one embodiment of the present invention, conduits 120d are coupled to heat transfer unit 118 using a flexible tubing. Temperature of inner sample stage assembly 120 is monitored by positioning temperature sensors in cavities 112e. In one embodiment of the present invention, four resistance thermometers are located on inner sample stage assembly 120 to measure the temperature and monitor thermal gradients of inner sample stage assembly 120. An exemplary resistance thermometer that can be used in inner sample stage assembly 120 to measure the temperature and monitor thermal gradients of inner sample stage assembly 120 include a 100Ω platinum resistance thermometers with thermometric tolerance $\Delta T < 0.13 \text{ K} + 0.0005|T-273.15 \text{ K}|$. In one embodiment of the present invention, a fluid circulator with temperature controller is coupled to heat transfer unit 118, conduits 120d and temperature sensors for setting the temperature of the heat transfer fluid circulated through the sample stage at a predetermined value.

Drive coil assembly 104 is formed by winding or wrapping a low resistance and low inductance coil around outer sample stage assembly 122, as shown in FIGS. 1 and 3, such that it spans a region on outer sample stage assembly 122 encasing sample sensor 108 and magnetic field sensor 106. In some embodiments of the present invention, the diameter of drive coil assembly 104 is about 25.4 mm. The windings of drive coil assembly 104 may be made of any suitable conductive and/or magnetic material, for example, copper, silver, aluminum, and the like. Drive coil assembly 104 formed by winding or wrapping a low resistance and low inductance coil can receive significant current at high frequencies to induce a magnetic field to upper sensor region 120a and a lower sensor region 120b of inner sample stage assembly 120. In one embodiment of the present invention, drive coil assembly 104 is formed by winding or wrapping a low resistance and low inductance solenoid coil around outer sample stage assembly 122. In some embodiments of the present invention, drive coil assembly 104 is formed by a pair of inductive drive coils to generate a magnetic field. In one embodiment of the present invention, drive coil assembly 104 is formed as a Helmholtz coil pair having two individual Helmholtz coils that are individually formed by resistive magnetic coils, such that a large, uniform magnetic field can be created between the coils while the sample volume remains accessible from the side. Each of the Helmholtz coils are formed by short, cylindrical magnetic coils, with the coil diameter of each magnetic coil being multiple times larger than its length. Each of the Helmholtz coils has an identical design, in particular an identical coil diameter and/or an identical coil width etc.

In embodiments in accordance with the present invention, where drive coil assembly 104 is formed as a Helmholtz coil pair, drive coils are arranged parallel and concentric to one another. Further, the separation between drive coils is substantially equal to the radius of the coils. The Helmholtz coil is a well-known arrangement that provides a region of constant magnetic field between the two coils, and this region extends further than in any other arrangement of the coils with a different ratio of separation-to-radius. In one embodiment of the present invention, the diameter of drive coils is such that sample stage 102 can be placed in the magnetic field region within drive coils.

In various embodiments of the present invention, it is desirable that drive coil assembly 104 is a low inductance drive coil. For example, in order to drive significant current through an inductive coil at high frequencies of up to 50 MHz, the inductance of coil must be maintained below 1 µH. Further, the resistance of the coil must also be maintained below about 1Ω over the entire frequency range. Inductance below 1 µH can be achieved by limiting the number of turns in the coil to 5 or fewer and limiting the cross-sectional area of the coil to less than about 40 mm$^2$. Resistance is maintained below 1Ω over the entire frequency range by using thick Litz wire bundle having an effective diameter greater than that of 10-gauge wire.

Figure 6:
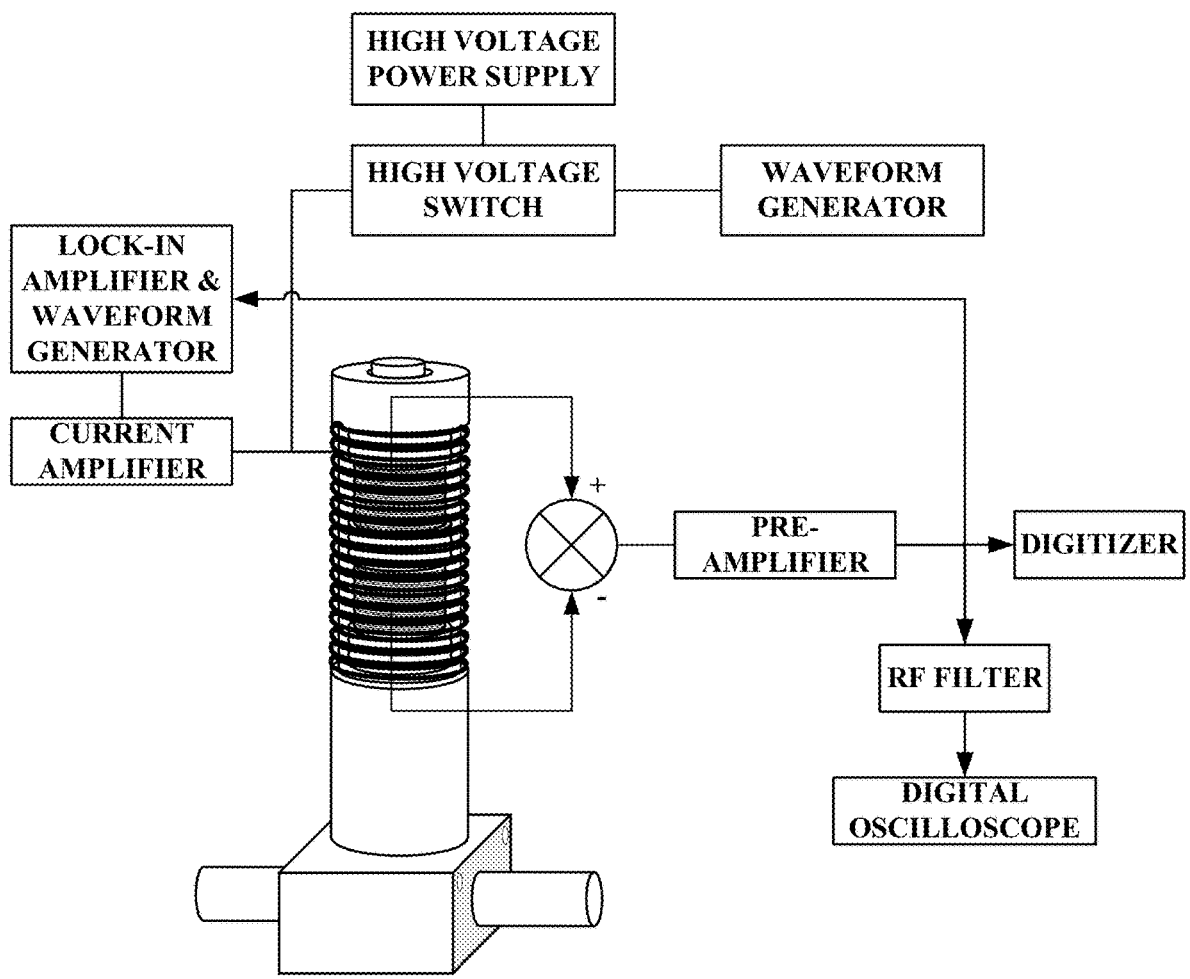
FIG. 6 illustrates an exemplary pulse magnetic field circuit used in accordance with an embodiment of the present invention.
Figure 7:
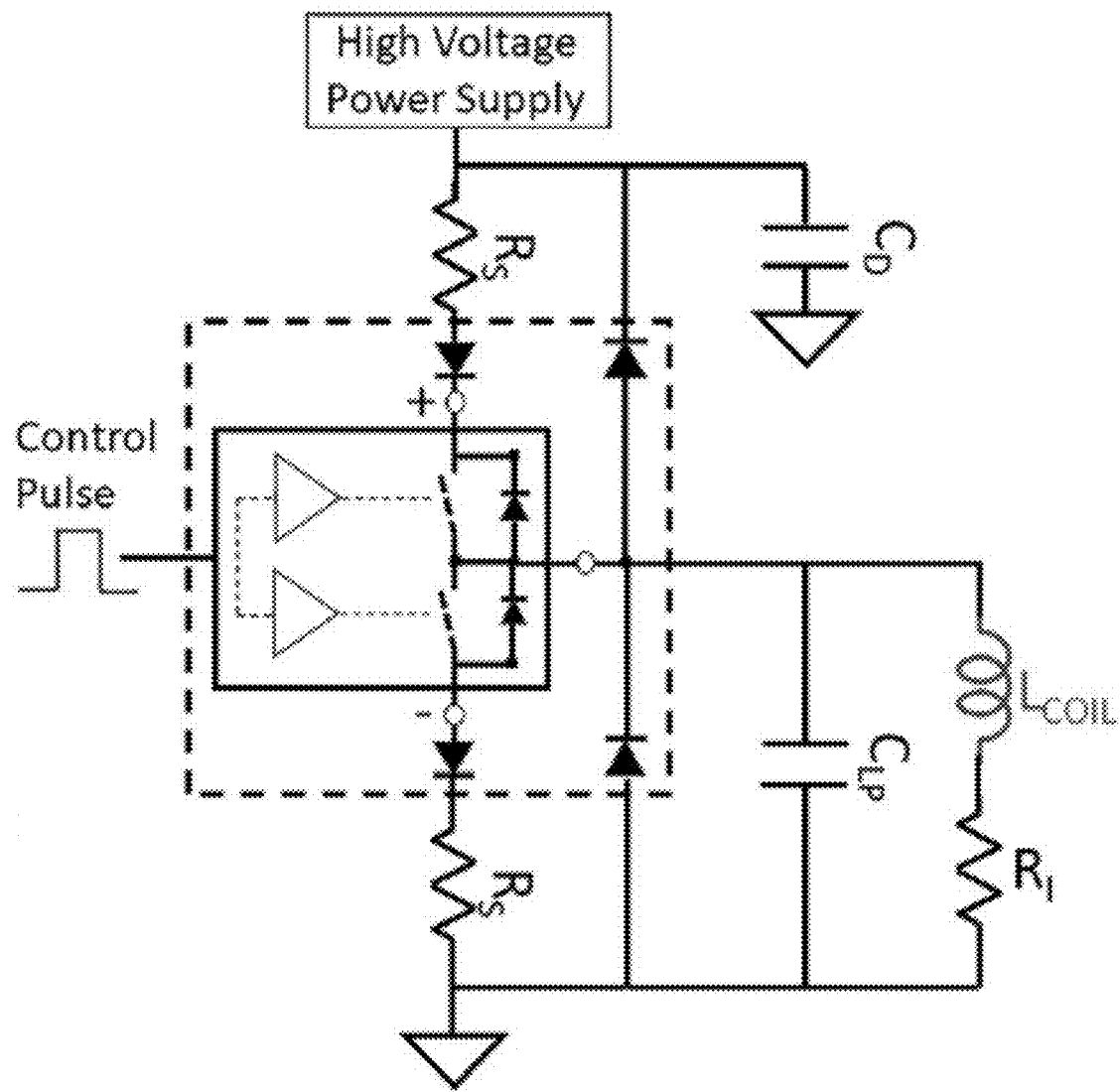
FIG. 7 illustrates an exemplary a high voltage switch that can be used to deliver pulsed currents supplied by a capacitor bank coupled to a high voltage power supply.

Electrical power source 110 is electrically coupled to drive coil assembly 104 to provide high-frequency alternating current to drive coil assembly 104. In one embodiment of the present invention, electrical power source 110 generates alternating current at a frequency of about 50 MHz to provide to drive coil assembly 104. In one embodiment of the present invention, drive coil assembly 104 is electrically coupled to electrical power source 110 including a power amplifier, lock-in amplifier and a waveform generator, as shown in FIG. 6. In another embodiment of the present invention, drive coil assembly 104 is electrically coupled to a capacitor circuit and capacitor circuit can be, in turn, electrically coupled to a waveform generator and high voltage power supply to generate a high-frequency alternating current having a pulsed waveform. In an exemplary embodiment of the present invention, in order to generate about 20 mT pulse with 10 ns rise (fall) time, electrical power source 110 includes a high voltage switch, as shown in FIG. 7, to deliver pulsed currents supplied by a capacitor bank coupled to a high voltage power supply. In some embodiments of the present invention, drive coil assembly 104 can be electrically coupled to two power amplifiers in parallel. In an exemplary embodiment of the present invention, drive coil assembly 104 is electrically coupled to two power amplifiers in parallel to achieve a magnetic field amplitude of about 500 µT. Power amplifier can be any suitable power amplifier capable of accurately reproducing and amplifying the power of an input signal. An exemplary amplifier that can be used in embodiments in accordance with the present invention include Cleverscope CS1ζ™ current amplifier. In some embodiments, power amplifier can be omitted and replaced with an electrical source, such as a power supply, a function generator, and other suitable electrical sources. In embodiments in accordance with the present invention, electrical power source 110 is electrically coupled to drive coil assembly 104 to provide various modes of measurement, including a pulsed circuit mode and AC susceptibility mode.

Referring back to FIGS. 1-3, Magnetic field sensor 100 for measuring the magnetic field generated by drive coil assembly 104 is formed by winding or wrapping an inductive coil on lower sensor region 120b of inner sample stage assembly 120. Sample sensor 108 for measuring the magnetic response of the magnetic nanoparticle sample to the magnetic field generated by drive coil assembly 104 is formed by winding or wrapping an inductive coil on upper sensor region 120a of inner sample holder assembly 120. Sample sensor 108 can be electrically coupled to magnetic field sensor 106. Inductive coils of magnetic field sensor 106 and sample sensor 108 are separated by a predetermined distance to avoid a detectable MNP signal at magnetic field sensor 106. In one embodiment of the present invention, the inductive coils of magnetic field sensor 106 and sample sensor 108 are separated by a distance of about 10 mm.

Magnetic field sensor 106 and sample sensor 108 have magnetic sensitivity over a wide frequency range. In one embodiment of the present invention, magnetic field sensor 106 and sample sensor 108 have magnetic sensitivity spanning from about DC to about 50 MHz. Magnetic field sensor 106 and sample sensor 108 having high sensitivity at high frequency can be achieved by maintaining narrow separation between the sample space and the inductive coil, by maintaining low inductance in the inductive coils, and by using Litz wire for the inductive coil windings. In one embodiment of the present invention, the separation between the sample space and the coil is maintained less than about 2 mm and the inductance in the inductive coils is set to less than about 1 µH. In other embodiments of the present invention, magnetic field sensor 106 and sample sensor 108 can include superconducting quantum interference devices (SQUIDs), giant magnetoresistance (GMR) detectors magnetometers, magnetic tunnel junction (MTJ) detectors, atomic magnetometers, anisotropic magnetoresistance (AMR) detectors, Hall devices, and the like.

It is desirable that sample sensor 108 only measure the rate of change of the magnetic moment of the nanoparticle sample in sample holder 124. However, magnetic response measurements by sample sensor 108 typically include direct induction or induced voltage from drive coil assembly 104 to sample sensor 108 called "feedthrough." Upper sensor region 120a and lower sensor region 120b can be used to mitigate feedthrough. Sample sensor 108 in upper sensor region 120a can detect the nanoparticle sample magnetization change and magnetic field sensor 106 in lower sensor region 120b can stabilize magnetic field generated by drive coil assembly 104 and cancel a portion of the magnetic field that is induced from drive coil assembly 104 into upper sensor region 120a. In some embodiments of the present invention, additional inductive coils can be positioned on upper sensor region 120a to maximize sensitivity of sample sensor 108. In other embodiments of the present invention, additional inductive coils can be positioned on lower sensor region 120b to maximize stabilization of magnetic field generated by drive coil assembly 104. In one embodiment of the present invention, inductive coils of magnetic field sensor 106 and sample sensor 108 are maintained independent to achieve drive field stabilization and feedthrough cancelation rather than directly using the two coils in a traditional gradiometric configuration. Sample sensor 108 is located closer to the sample and magnetic field sensor 106 is relatively far from the sample but still within the uniform field region of drive coil assembly 104.

Receive circuit 112 is electrically coupled to sample sensor 108 to electronically process (sum, amplify, and filter) a voltage induced in the inductive coil of sample sensor 108. In one embodiment of the present invention, receive circuit 112 includes a summer for adding the signals from both arms of the gradiometer, a pre-amplifier for amplifying the voltage, and a RF Filter for removing feedthrough signal and/or higher harmonics. Digitizer 114 receives the filtered data from receive circuit 112 and digitizes the filtered data for processing at processor 116. In some embodiments of the present invention, a digital oscilloscope can also be used in conjunction with digitizer 114 to receive the filtered data from receiver 112 and digitize the filtered data for processing at processor 116.

Processor 116 receives the digitized data from digitizer 114 to determine intrinsic parameters of the magnetic nanoparticles sample. In magnetic relaxometry based on pulsed magnetic fields applied by drive coil assembly 104 to the magnetic nanoparticles sample, processor 116 processes and analyzes magnetization response for the magnetic nanoparticles with a predetermined magnetic field amplitude at a temperature, fits time-dependent magnetization data using a bi-exponential rise function, and determines magnetic relaxation time constants $\tau 1$ and $\tau 2$ from the fitted magnetization data. The dependence of the time constants on temperature and on magnetic field amplitude can be determined by running a series of experiments which vary these parameters. During operation of magnetic nanoparticle spectrometer 100 in AC susceptibility mode, processor 116 determines fast Néel dynamics by analyzing data over a wide of frequencies from about 1 kHz to about 50 MHz. In AC susceptibility mode, processor 116 determines temperature-dependent AC susceptibility data for an in-phase component and out of phase component (real ($\chi'$) and imaginary ($\chi''$) components) of the magnetic nanoparticles for a predetermined temperature range. Processor 116 then determines relaxation timescale of Nèel and Brownian relaxation from peaks in the imaginary ($\chi''$) component of temperature-dependent AC susceptibility data, which includes deriving magnetic anisotropy of the magnetic nanoparticle from measurement of the relaxation time constant, magnetic anisotropy constant and attempt time of nanoparticles. Processor 116 can further determine the energy barrier distribution (anisotropy energy) of the magnetic nanoparticles directly from the AC susceptibility temperature-dependent data by plotting magnetic energy barrier distribution data as a function of this energy to provide a graphical depiction of the magnetic energy distribution. The result is a collapse of all the temperature-dependent AC susceptibility curves into a single master curve when overlaid, as demonstrated in examples provided herein.

Magnetic nanoparticle spectrometer 100 can also include a data capture system comprising sensors, various analog and digital electronic components, and a processor to measure the current being supplied to drive coil assembly 104 and other electrical or physical phenomenon, such as voltage, temperature, and other suitable signals. In some embodiments, the data capture system generates a sinusoidal or pulsed input signal to controller 116.

Figure 8:
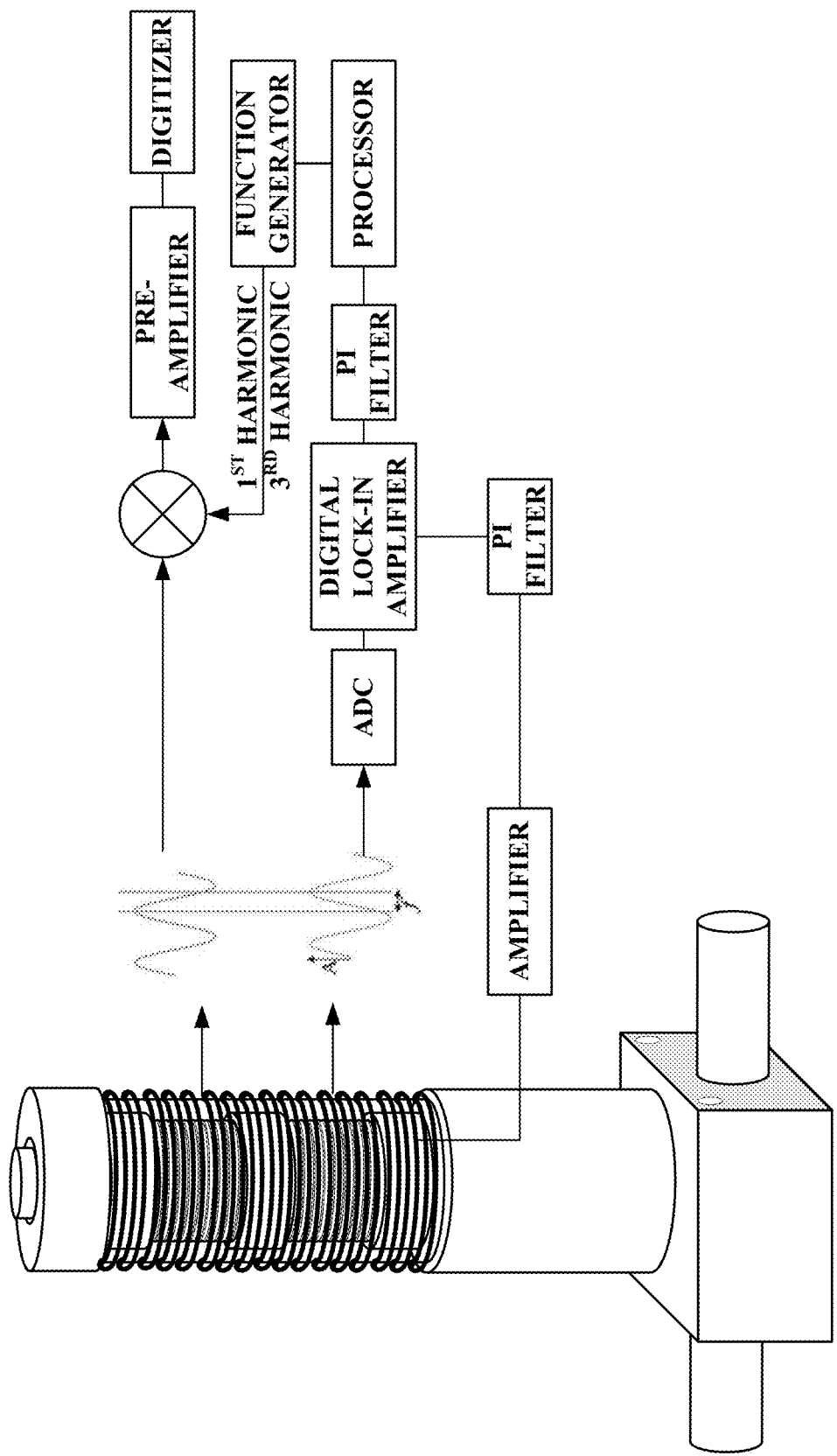
FIG. 8 illustrates an exemplary controller for providing feedback control to an apparatus in accordance with an embodiment of the present invention.
Figure 9:
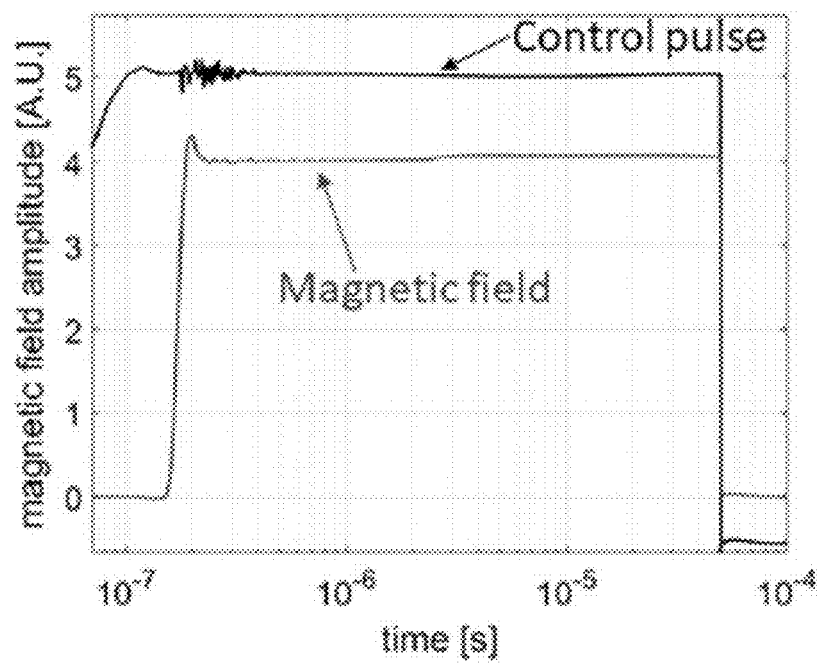
FIG. 9 illustrates a plot of magnetic field pulse with 20 ns rise time and 50 µs pulse duration.
Figure 10:
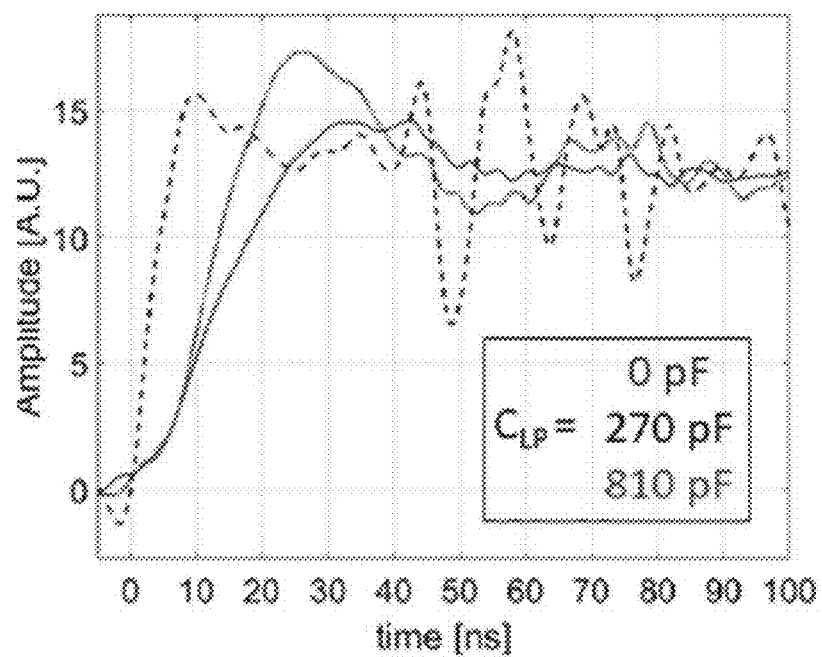
FIG. 10 illustrates a plot of pulse rise (fall) time and ringing as a function of capacitance CLP.

Magnetic nanoparticle spectrometer 100 can also include a controller to provide a feedback control system for stabilization of the drive field and subtraction of feedthrough signal, as shown in FIG. 8. Controller includes a digital lock-in amplifier to measure the amplitude and phase of the drive field first and third harmonics detected by magnetic field sensor 106. The amplitude of the first harmonic is used for the stabilization of the drive field, and the first and third harmonic amplitude and phase are used for feedthrough subtraction of signal detected by sample sensor 108. Real-time proportional-integral (PI) lock loops maintain the drive field stabilization and feedthrough subtraction.

Drive field stabilization feedback lock compares the first harmonic amplitude detected by magnetic field sensor 106 to a set point. The difference between the first harmonic amplitude and the set point is used as the error signal for controlling the amplitude of a function generator to keep the first harmonic amplitude stable at the set-point value. In contrast to this drive field stabilization feedback lock, the feedthrough signal cancelation is a feedforward-type lock that includes a second function generator to provide the feedforward cancelation signal.

The first and third harmonic amplitude and phase detected by magnetic field sensor 106, and after electronic filtering, are used to calculate an offset voltage and orthogonal phase to sample sensor 108 signal. The correction signal sets the output value of a second function generator as the orthogonal amplitude and phase for first and third harmonics. The function generator's outputs for first and third harmonics are summed and sent into one channel of a preamplifier. The sample sensor 108 signal is fed into the second channel of the preamplifier, and the differential output of the two channels is digitized with a digitizer (e.g., PXI 592235 instrument (5×104 samples per second, 24 bit)). This configuration maintains active subtraction of the first and third harmonics drive signal (received from magnetic field sensor 106) from the MNP magnetization signal (received from sample sensor 108). Although only the first and third harmonic signals are actively subtracted, this method can be applied for an arbitrary number of harmonics.

In some embodiments, processor 116 or controller can be coupled to or installed within a computing device. The computing device can comprise, for example, a processor-based system such as a desktop computer, a laptop computer, tablet computer, or other computing device with similar capability. The computing device can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. Computing and digital acquisition devices included in processor 116 or controller can also be field-programmable gate arrays (FPGAs), digital acquisition cards, and the like.

The computing device can be configured to execute various applications such as a signal analysis application and/or other applications. The signal analysis application can be executed in the computing device, for example, for signal analysis processing, such as remaining feedthrough subtraction. The remaining feedthrough can refer to feedthrough after hardware cancellation and before software subtraction. To this end, the signal analysis application can comprise, for example, an internet browser, a dedicated application, etc., and the user interface can comprise a network page, an application screen, etc.

Embodiments in accordance with the present invention can be used to perform a variety of magnetic measurements either as a function of time or as a function of frequency. The magnetic drive field produced can be at a single frequency with amplitude stabilization, a combination of frequency components, or a repeated pulse waveform. Embodiments of the present invention enable measurements as a function of sample temperature. Embodiments of the present invention also enable a magnetic nanoparticle sample to be driven by arbitrary waveforms and by swept single tones of up to 50 MHz. Exemplary magnetic measurement modes using embodiments of the present invention include:

Magnetic Particle Spectroscopy: The drive coil is energized at a single frequency at a time and the frequency response amplitude (i.e., the Fourier-transform of the time response) from the sample is determined. A wide range of frequencies from 1 Hz to 50 MHz can be swept, with a dwell time at each frequency typically on the order of 100 ms. The amplitudes of the frequency harmonics provide a "fingerprint" of the sample magnetic response, as well as the dynamics of this response. Measurements obtained as a function of temperature using embodiments of the present invention can be used to screen magnetic nano-objects (MNOs) for use as sensitive magnetic thermometers.

AC Susceptibility: The drive coil is energized at a single frequency at a time and both the in-phase and out-of-phase frequency response from the sample is determined. A wide range of frequencies from 1 Hz to 50 MHz can be swept, with a dwell time at each frequency typically on the order of 100 ms. These components of susceptibility, particularly the imaginary (out-of-phase) component, provide information on magnetic time constants of the sample. Measurements obtained as a function of temperature using embodiments of the present invention can be used to determine the physical origin of the different magnetic time constants observed.

AC Magnetic Hysteresis Curves: The drive coil is energized at a single frequency and the trace of sample magnetization vs. drive field (M vs. H) is plotted after determining the electronic phase shifts of the instrument from a blank (no sample) measurement. The M vs. H characteristic at different frequencies provide information on the nature and dynamics of the magnetization switching in the sample.

Magnetic Relaxation: The drive coil is energized with a pulse and the time response from the sample is determined. This relaxation measurement provides a direct probe of magnetic switching behavior at timescales as short as 20 ns. Measurements obtained as a function of temperature using embodiments of the present invention can be used to determine the physical origin of the different magnetic time constants observed in the response.

Arbitrary-wave Dynamics and Spectroscopy: The drive coil is energized with tailored drive pulses and the time or frequency response is analyzed. This information can be used to separate steady-state behavior from relaxation behavior for the sample. Series of pulses can be used to initiate and probe transient behavior in the sample (pulse-probe measurement).

Imaging Point Spread Function: For a small sample (approximating a point-like object), either magnetic particle spectroscopy or arbitrary-wave dynamics and spectroscopy can be used to calculate the point spread function (PSF) for magnetic particle imaging, in the case of sinusoidal or pulsed drive, respectively. An additional DC offset field can be used in the drive field to study the PSF over a larger field-of-view.

Reference now to the specific examples which follow will provide a clearer understanding of systems in accordance with embodiments of the present invention. The examples should not be construed as a limitation upon the scope of the present invention.

Example A. Temperature Tunable Arbitrary Waveform Spectrometer.

An exemplary temperature tunable (250 K to 350 K) arbitrary waveform spectrometer (T-AWS) constructed in accordance with an embodiment of the present invention has frequency agile capabilities over the frequency range of DC to 10 MHz and magnetic field amplitudes up to 10 $mT_{RMS}$. The broad frequency and temperature tuning capabilities are made possible by a compact design of the spectrometer using custom-machined Shapal ceramic, and custom wound solenoid coils with Litz wire.

The magnetic coil form and magnetic nanoparticle sample holder were fabricated using machined Shapal ceramic. Shapal's high thermal conductivity (92 W/m·K) and non-magnetic properties facilitate temperature tunability and utility in a high magnetic field environment, respectively. Polycarbonate NPT/barb hose adapters (operating temperature range of 140 K to 405 K) on the Shapal sample holder enables ethylene glycol/ethanol flow from a recirculating chiller for temperature tuning. The adapter is attached to the Shapal mount using non-magnetic epoxy from Masterbond (EP39MHT) with an operating temperature range from −200 K to 480 K. Liquid nanoparticle samples are contained in sapphire crucible with 5 mm outer diameter and length of 8 mm.

To achieve high magnetic fields over a broad frequency range (DC—10 MHz), the wires and solenoid coils must exhibit low inductance. Litz wire (New England Wire Technologies)—a bundle to 2700 strands of 48-gauge wire with an effective gauge of 14—is used for winding magnetic coils. To further reduce the inductance of Litz wire, four 14-gauge bundles are twisted in parallel to increase the cross-sectional area to an effective gauge of 5. Starting from this 5-gauge Litz wire, the solenoid coils to generate the high frequency magnetic field are wound with consideration for the geometry (number of turns, coil diameter, etc.) to keep the inductance low. Low inductance coils necessitate small dimensions for both the drive coil and the detector inductive coil. The form cylinder for the drive coil have a radius of 5 mm and length of 10 mm. The number of turns is 5. The ~400 nH drive coil is impedance matched with a 22 Ohm power resistor to achieve a −3 dB frequency response of about 10 MHz.

Example B. Advanced Characterization of Magnetization Dynamics in Iron Oxide Magnetic Nanoparticle Tracers.

AC susceptibility (ACS) and magnetic relaxometry (MRX) are required to elucidate the full dynamics of magnetic nanoparticles. The complexity of nanoparticle dynamics can be resolved using a temperature-tunable dual mode ACS/MRX instrument, which covers a broad range of frequencies/timescales, and apply it to study iron oxide MNP ensembles. In ACS mode, the range of the instrument is from 1 kHz to 50 MHz, permitting the identification of fast Néel dynamics near 10 MHz. In the MRX mode, the instrument's range is from 10 ns to 1 ms, allowing concurrent study of Néel and Brownian dynamics. The following is an experimental study of the dependence of the fast Néel time constant on the magnetic field amplitude up to 5 mT, a lower limit for MPI. Temperature tunability from 240 K to 360 K enables study of the functional dependence of time constants on temperature.

Litz wire was used to wind a low inductance (300 nH) solenoid coil for ACS and MRX, as shown in FIGS. 1 and 2. In ACS, the drive coil is driven by two current amplifiers wired in parallel to achieve a magnetic field amplitude of 500 μT. For MRX, MNPs are driven by a magnetic field pulse with fast rise (fall) time. To meet the requirements of a >20 mT pulse with 10 ns rise (fall) time, a high voltage switch, as shown in FIG. 7, is used to deliver pulsed currents supplied by a capacitor bank connected to a high voltage power supply [FIGS. 7 and 8]. The detector for both ACS and MRX is an inductive coil wound as a first-order gradiometer. The MNP sample holder is machined out of thermally conductive Shapal ceramic, allowing for efficient liquid cooling and heating.

Two sizes of iron oxide MNPs suspended in water, SHP-15 and SHP-20, from Ocean NanoTech were examined by ACS and MRX. Transmission electron microscopy indicates core sizes of (14.8 ±1.0) nm and (21.2 ±1.5) nm for SHP-15 and SHP-20, respectively. The MNPs are coated with a carboxylic acid-modified polymer shell, and the solution concentration is 5 mg/ml of Fe in water. Dynamic light scattering (DLS) measurements suggest minimal clustering in solution for SHP-15 with a mean diameter of (22

±7) nm. Clustering appears more significant for SHP-20 with a mean diameter of (43 ±16) nm.

Figure 11:
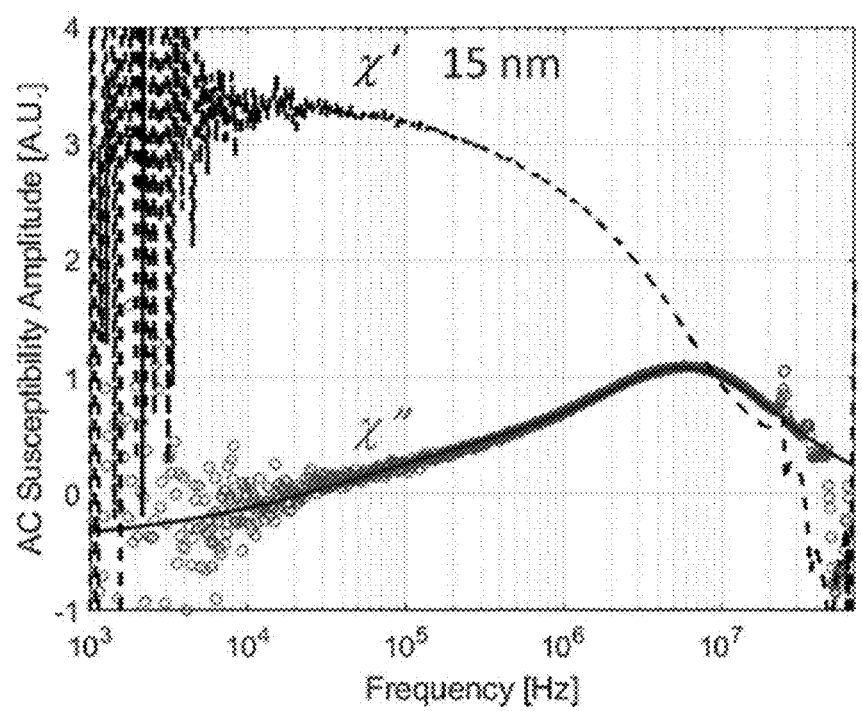
FIG. 11 illustrates room temperature (295 K) ACS spectrum of (A) 15 nm MNPs and (B) 20 nm MNPs.
Figure 11:
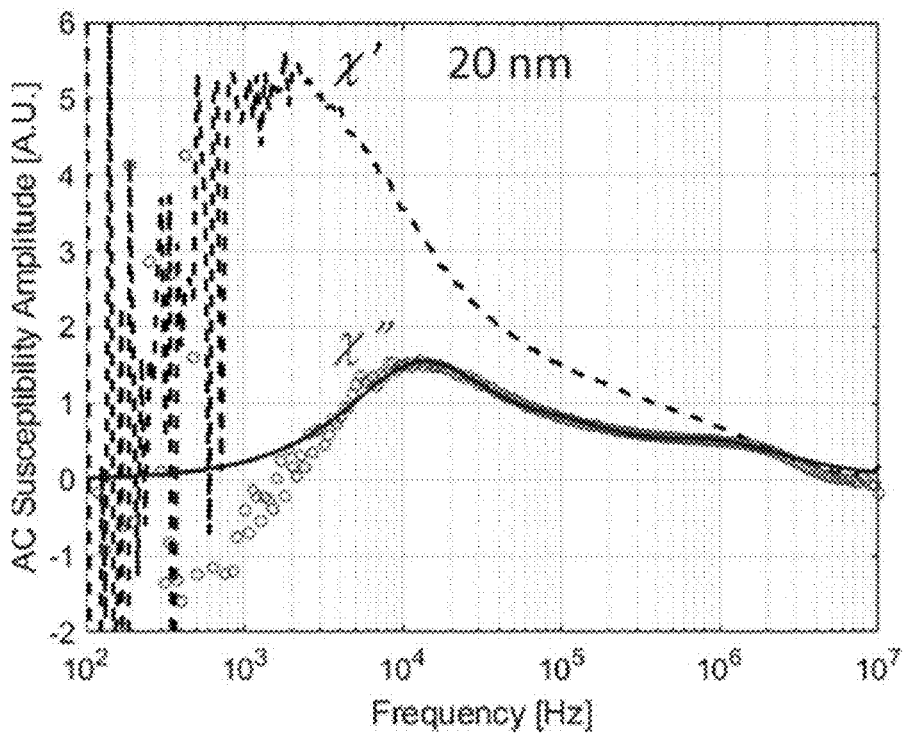

Typical magnetite nanoparticles for MPI exhibit Brownian and Néel relaxation frequencies around 10 kHz and 10 MHz, respectively, near room temperature, depending on particle size. The Néel time constant for MNPs at cryogenic temperatures can be significantly slower relative to MNPs at room temperature. FIG. 11 shows the AC susceptibility spectrum for the real ($\chi'$) and imaginary ($\chi''$) components of 15 and 20 nm MNPs, respectively, at room temperature ($\approx$295 K). The applied magnetic field amplitude is 500 The relaxation timescale of Néel and Brownian relaxation can be qualitatively determined from peaks in the imaginary ($\chi''$) component of ACS. The imaginary component displays a prominent peak near 6 MHz and 13 kHz for 15 nm FIG. 11(A) and 20 nm FIG. 11(B) MNPs, respectively.

For iron oxide MNPs, uniaxial symmetry is assumed for simplicity. The magnetic anisotropy is derived from measurement of the relaxation time constant, $\tau=(2\pi f_{peak})^{-1}$, and Néel relaxation is treated as an activated process described by the Arrhenius model, $$\tau N = \tau_0 \exp(KV_M/k_B T) \qquad (1)$$

Here, $K$ is the uniaxial anisotropy constant, $\tau_0$ is the attempt time, $k_B$ is the Boltzmann constant, $T$ is the temperature, and $V_M$ is the magnetic volume. The product $KV_M$ is the energy barrier ($E_b = KV_M$) for the magnetic moment to change its direction to find an energy minimum. For these particle sizes, the Néel time constant is expected to be in the corresponding 1-10 MHz frequency range, and the prominent feature near 6 MHz for 15 nm MNPs in FIG. 11(A) corresponds to Néel relaxation. ACS data comparing frozen, powder, and solution-based samples support this identification.

For Brownian motion, the relaxation time is described by the relation $$T_B = 3\eta V_H / k_B T \qquad (2)$$

Here, $V_H$ is the hydrodynamic volume and $\eta$ is the viscosity. For these particle sizes, the Brownian time constant is expected to be in the corresponding 10-50 kHz frequency range, depending on the viscosity and temperature. Thus, the 13 kHz peak in FIG. 11(B) for 20 nm MNPs corresponds to Brownian relaxation, with an apparent smaller Néel peak near 1 MHz. These assignments are supported by ACS measurements of the frozen 20 nm sample.

The qualitative assessments described above only reveal a partial picture of magnetization dynamics in the system. The presence of two discernible $\chi'''$ peaks in most of the ACS data, including other iron oxide families, cannot be fitted to the simplest relaxation model involving a single effective relaxation time constant. Instead, a proper description of the ACS spectrum must include both Brownian and Néel contributions. A phenomenological model describing the AC susceptibility spectrum as a superposition of Brownian and Néel relaxation is used to fit the peak frequencies, $$\chi(\omega) = \chi_{0,B} \int_0^\infty \frac{\rho(\tau)}{1+i\omega\tau_B} d\tau + \frac{\chi_{0,N}}{1+(i\omega\tau_N)^\alpha} + \chi_\infty \qquad (3)$$

Here, $\omega$ is the angular frequency, $\rho(\tau)$ is the lognormal distribution of Brownian time constants corresponding to a distribution of hydrodynamic diameters, $\chi_{0,B}$ and $\chi_{0,N}$ are the amplitudes, and $\tau_B$ and $\tau_N$ are the Brownian and Néel time constants, respectively. $\alpha$ is the phenomenological Cole-Cole parameter describing a distribution of Néel time constants, and $\chi_\infty$ is a high frequency AC susceptibility constant offset. Fits to the ACS spectra using Equation (3) are shown for 15 and 20 nm MNPs in FIGS. 11(A) and 11(B), respectively. For 15 nm MNPs, in addition to the conspicuous peak at frequencies >5 MHz, the fits imply a less prominent peak near 1 MHz, with a relative amplitude of 20% of the higher frequency peak. However, this timescale is too fast for Brownian rotation of 15 nm nanoparticles in water ($\tau_B$>10 μs) and must originate elsewhere. For 20 nm MNPs, the model in Equation (3) captures the $\chi'''$ peaks near 13 kHz and 1 MHz, with relative amplitudes of 3:1, which are attributed to Brownian and Néel relaxation, respectively. Furthermore, a fitted relative standard deviation, RSD, of $\approx$0.41 in the distribution of hydrodynamic volumes for the 13 kHz Brownian peak is consistent with DLS measurement (RSD_0.36). This multiparameter fitting procedure with the model in Equation (3), while providing high quality fits, may not be well constrained, and care must be taken in the quantitative interpretation of its parameters.

Figure 12:
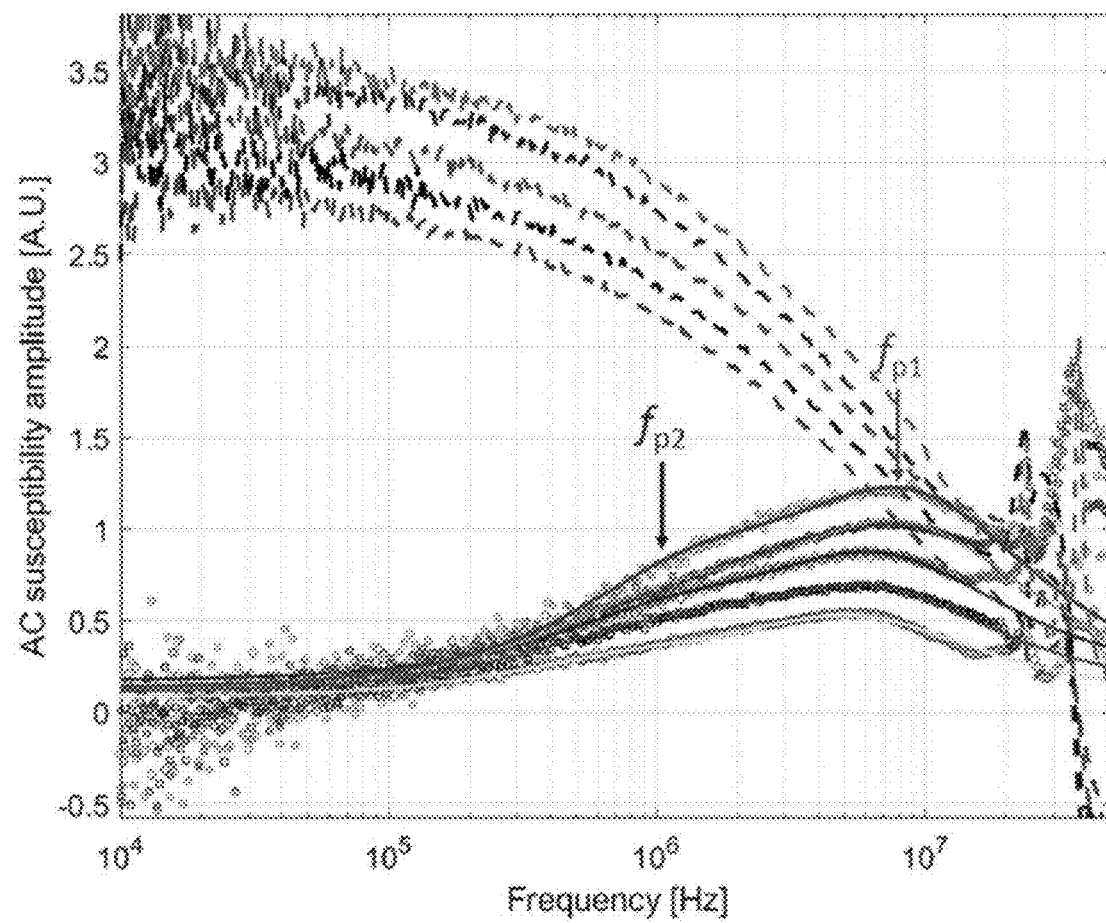
FIG. 12 illustrates a plot showing the temperature dependence of ACS for 15 nm MNPs.
Figure 13:
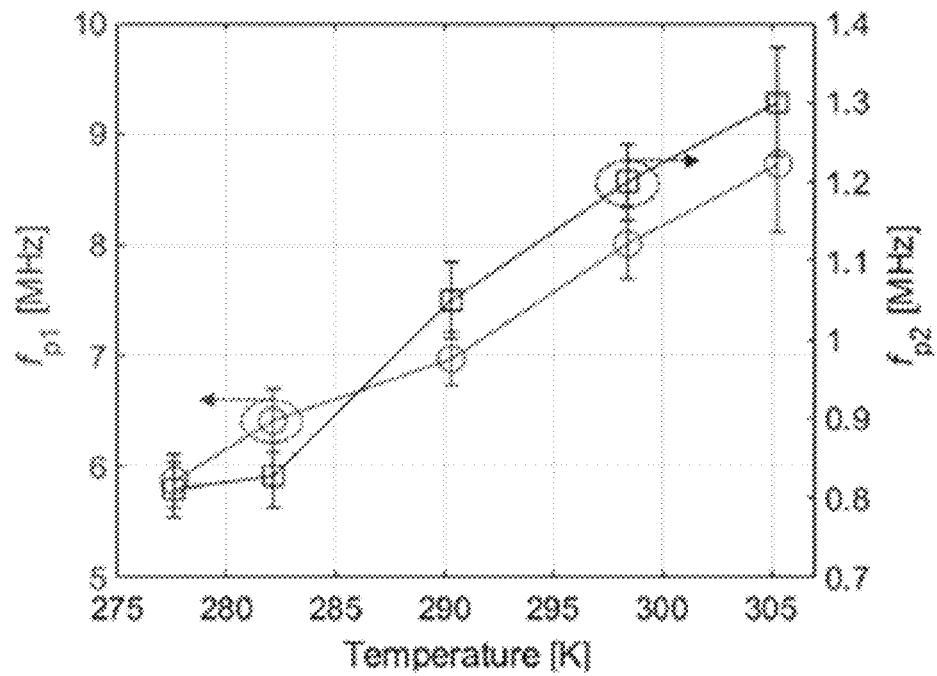
FIG. 13 illustrates a plot showing fitted peak for $\chi''$ in FIG. 12.

Temperature-dependent ACS has been analyzed to provide supporting evidence for the Néel character of the peaks near 1 MHz and higher frequencies, estimate K and s0, and determine the shape of the anisotropy energy distribution. FIG. 12 shows the temperature dependence of ACS for 15 nm MNPs. The observed peak in the raw data shifts to higher frequencies with the increasing temperature, and the peaks fitted using Equation (3) show similar behavior [FIG. 13]. Néel relaxation is described by the Arrhenius law in Equation (1). In a simple model, assuming monodisperse samples at the peak frequencies, one can calculate estimates for K and $\tau_0$. Taking the natural log of Equation (1) gives $$\ln \tau_N = \frac{KV_M}{k_B} \frac{1}{T} + \ln \tau_0 \qquad (4)$$

Figure 14:
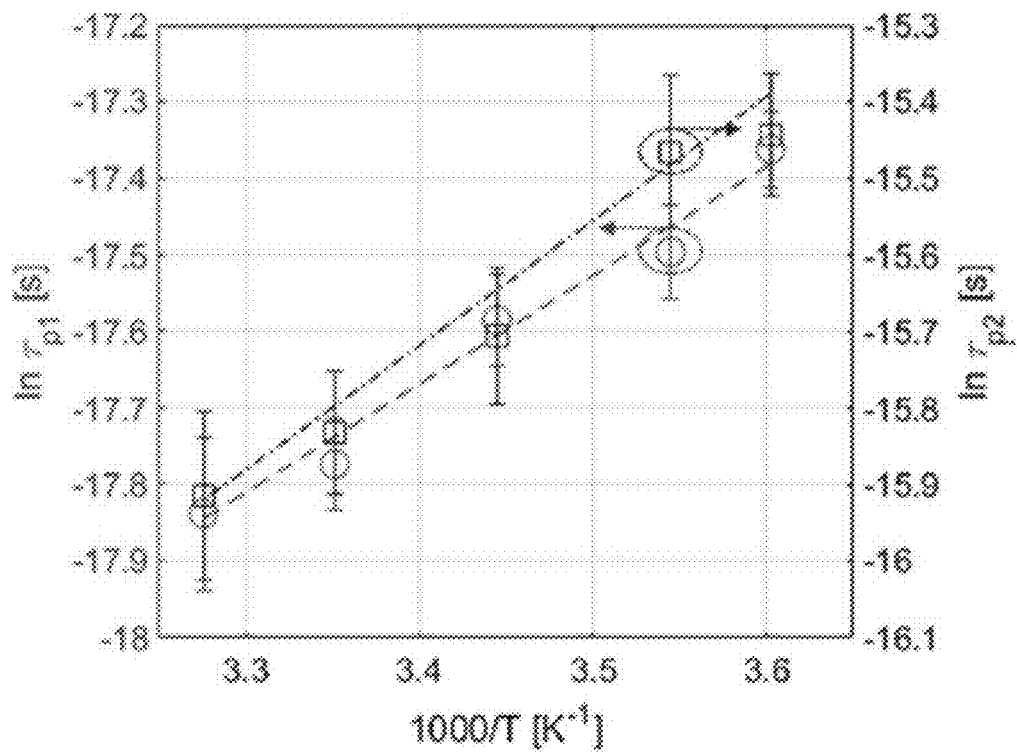
FIG. 14 illustrates a plot of MNP time constant versus inverse temperature using data shown in FIG. 12.

A plot of the fitted Néel time constants according to Equation (4) is shown in FIG. 14. The anisotropy constants K for the two $\chi''$ peaks are determined to be (9.3±1.4) kJ/m$_3$ and (12±1.8) kJ/m, and $\tau_0$ is (0.37±0.25) ns and (0.72±0.57) ns for the higher ($\approx$6 MHz) and lower frequency ($\approx$1 MHz) peaks, respectively. Here, the $V_M$ is based upon TEM. This observation of bimodal anisotropy energies indicates the presence of two distinct magnetic populations in our 15 nm sample, and not due to a bimodal volume distribution, a conclusion supported by: (1) the narrow dispersion of the physical diameter in the TEM analysis and (2) observed mixed crystallinity in the high-resolution TEM data. Furthermore, the observed linearity of $\ln\tau_N$ vs 1/T plots in FIG. 14 suggests that 15 nm MNPs are weakly interacting and that the Arrhenius model adequately describes the observed dynamics. This contrasts with systems that are strongly impacted by interparticle dipolar coupling. With temperature-dependent ACS data, this analysis allows for a direct experimental estimation of the uniaxial magnetic anisotropy constant, K, and the attempt time, $\tau_0$, of nanoparticles in the dilute limit.

Figure 15:
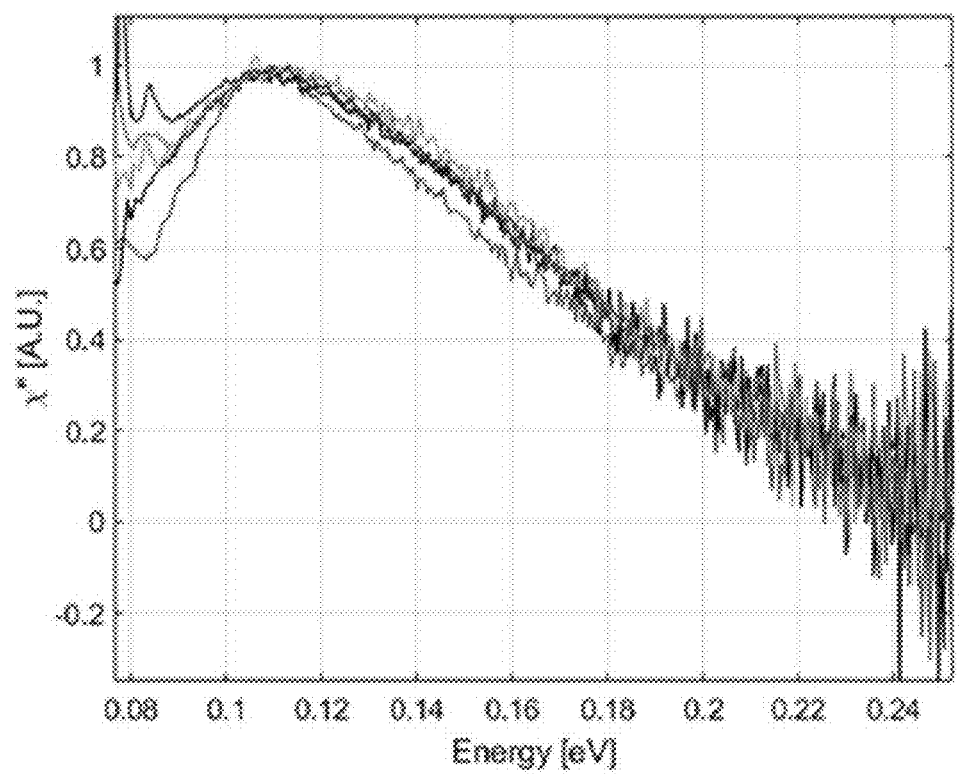
FIG. 15 illustrates a calculated magnetic energy barrier distribution for the MNP response plot shown in FIG. 12.
Figure 16:
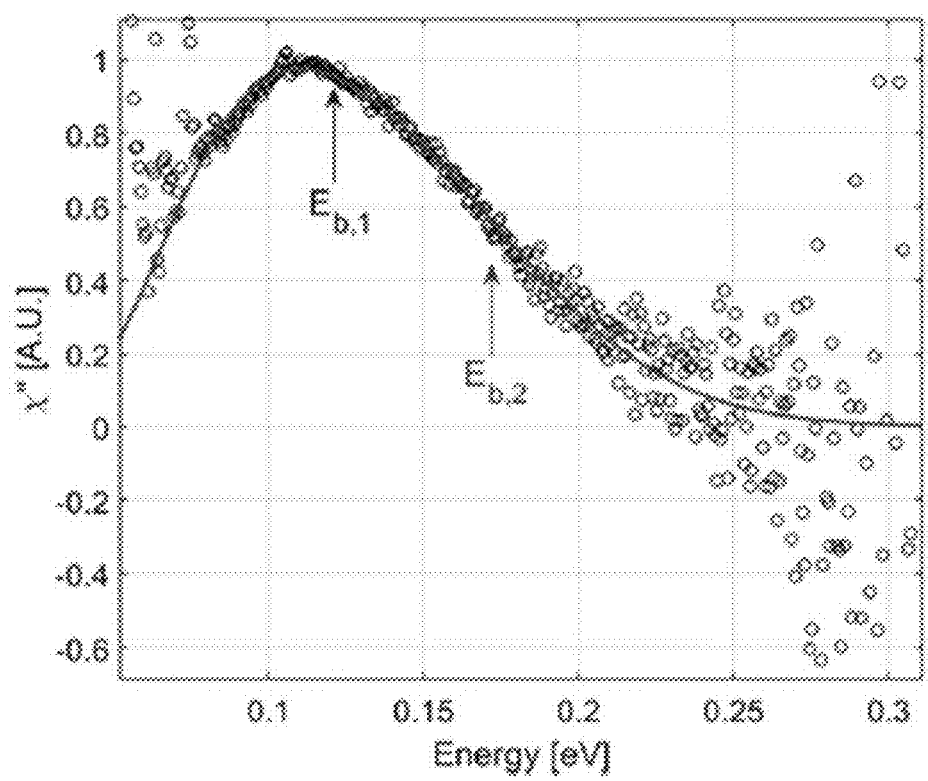
FIG. 16 shows a plot fitting a bi-modal normalized gamma function for 305.3 K data from FIG. 15.

The magnetic energy barrier distribution (magnetic polydispersity) can be directly determined from the ACS temperature-dependent data in an analysis which makes no assumptions about the specific functional form of the distribution. Due to a distribution of nanoparticle sizes, and a related magnetic energy barrier ($KV_M$) distribution, data from FIG. 12 can be replotted as a function of this energy, by application of Equation (1), to provide a graphical depiction of the magnetic energy distribution. The result is a collapse of all the temperature dependent ACS curves into a single master curve when overlaid, as demonstrated in FIG. 15. The only adjustable parameter is $\tau_0$, which in this case is set to the value of 0.37 ns obtained from analysis using Equation (4). Values of to between 0.3 and 1 ns gave qualitatively similar results and fall within reported $\tau_0$ values for iron oxide nanoparticles. Attempts to fit with the Vogel-Fulcher law in which T in Equation (1) is modified to (T−$T_0$), where $T_0$ is the spin freezing temperature, gave the best collapsed result with $T_0$>0 [FIG. 15]. The interpretation of $T_0$ is such that for T>$T_0$, thermal energy dominates, while for T<$T_0$, interactions dominate. A negligible $T_0$ in this case is further validation that the interparticle interactions are minimal, and the nanoparticle system in accordance with an embodiment of the present invention can be described by the non-interacting Arrhenius law. Finally, the energy barrier distribution was fit using a normalized gamma function to obtain the energy barrier distributions. With the presence of two distinct anisotropy energies and distributions, a sum of two gamma functions was used for the fit displayed in FIG. 16. The fitted energy barriers are $E_{b,1}$=(0.118±0.041) eV and $E_{b,2}$=(0.173±0.039) eV, respectively. Using a mean volume based upon particle diameters from TEM, the determined anisotropy constants are (10.7±3.7) and (15.7±3.5) kJ/$m_3$, respectively, and agree with those obtained by the more basic analysis of Equation (4).

Figure 17:
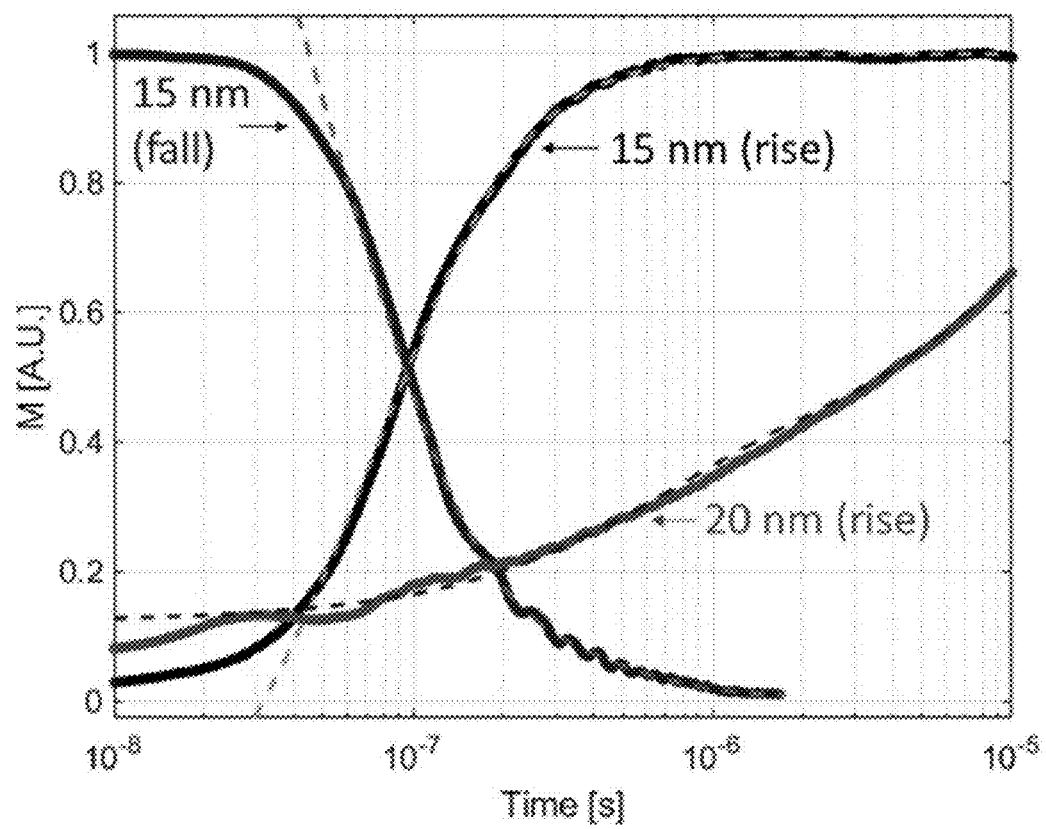
FIG. 17 illustrates a plot for room temperature magnetization response of 15 nm MNPs at the rising and falling edge of a 1 mT magnetic field pulse.

Magnetic relaxometry based on pulsed magnetic fields complements ACS and provides unique information about MNP dynamics. With pulsed fields, dynamics can be observed with and without a constant magnetic field. In addition to fundamental dynamics characterization, pulsed excitation can be an alternative approach for MPI because it does not require deconvolution steps to decouple nanoparticle relaxation from magnetization response to an AC field. Also, determination of the distinct relaxation mechanisms can be a promising contrast mechanism for bioimaging and diagnostics. Here, the pulsed measurements are demonstrated using magnetic field amplitude up to 5 mT at 20 ns rise time. FIG. 17 shows the normalized magnetization response for 15 and 20 nm MNPs with a magnetic field amplitude of 1 mT at room temperature. The magnetization response from both the rising (field on) and falling (zero-field) edges of the magnetic field pulsed are shown for 15 nm MNPs. The maximum magnetization, $M_{max}$, is reached before 1 μs for 15 nm MNPs while 20 nm MNPs have not yet reached $M_{max}$ by 10 μs. The magnetization data were fitted using a bi-exponential rise function to describe magnetization, $$M_{obs}(t)=M_1(t)+M_2(t) \quad (5)$$

Each individual component of $M_{obs}$(t) is given by $$M(t)=M_{max}(1-\exp[-t/t]) \quad (6)$$

The fitted time constants for 15 nm MNPs are τ=(49±15) ns and τ=(192±17) ns, corresponding to (3.2±1.0) MHz and (829±74) kHz, and with relative amplitudes of 3:1, respectively. These fast timescales correspond to Néel relaxation as determined from ACS. For 20 nm MNPs, τ=(210630) ns and τ=(9.10660) μs, corresponding to (757±108) kHz and (17.5±1.2) kHz, respectively. These two timescales validate the observed Néel and Brownian peaks, respectively, from ACS [FIGS. 11(A) and 11(B)]. The relative signal amplitude ratio for the Brownian and Néel relaxation is 3:1. Even though a more comprehensive model involving a distribution function of time constants has been used previously to fit relaxation data, the fit quality using Equation (5) that relies on the least number of fitted parameters is sufficient within our signal-to-noise ratio to determine relaxation time constants. When comparing ACS with MRX, the discrepancy in the measured time constants, especially in the Néel process, is not likely due to a convolution of the instrument response because a 20 ns instrument rise time is faster (2×) than all measured time constants. A longer observed Néel time constant for MRX relative to ACS can be explained by the larger (2×) driving magnetic field amplitude in MRX. Another possibility is the different ways that the particles are driven, by a sinusoidal field in ACS compared to a constant field in pulsed excitation, may lead to somewhat different time constants. Numerical simulations of this effect will be a subject of future study. These measurements corroborate the ACS measurements and validates the presence of multiple, simultaneous relaxation mechanisms, including Néel and Brownian relaxation for 20 nm MNPs.

Figure 18:
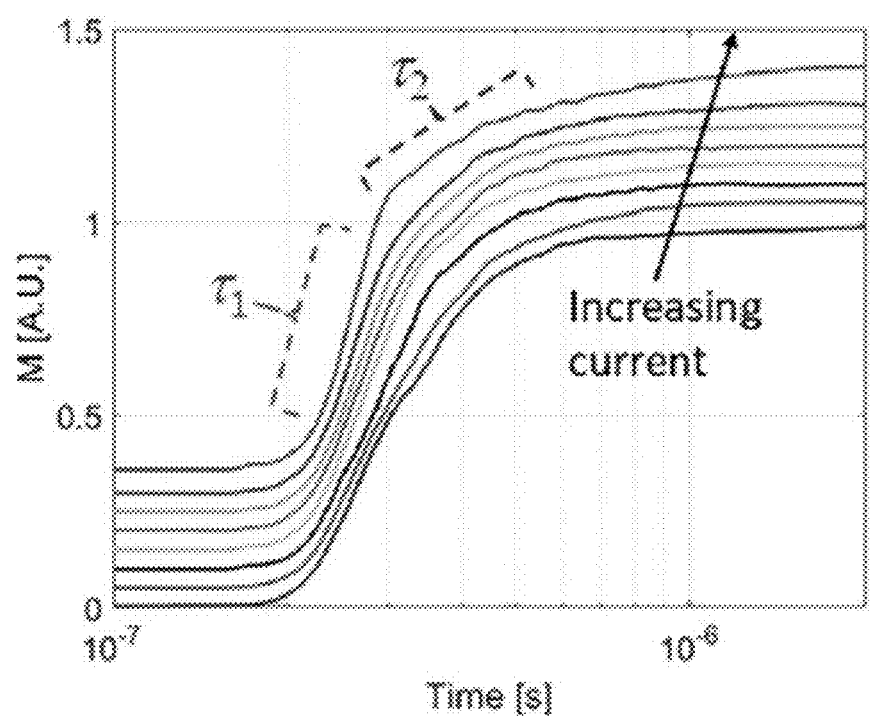
FIG. 18 illustrates a plot showing magnetization response of 15 nm MNPs as a function of current, wherein the maximum current shown produces a 5 mT magnetic field pulse.
Figure 19:
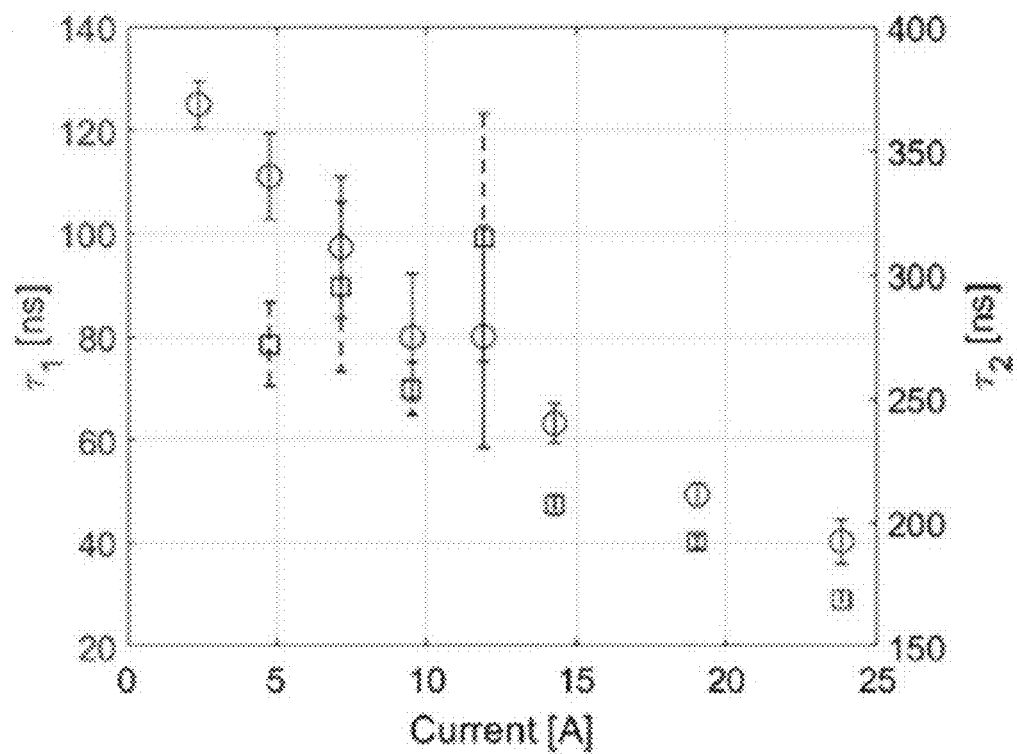
FIG. 19 illustrates a plot showing the time constant for the $\tau_1$ and $\tau_2$ processes from FIG. 18.

Magnetization dynamics are known to strongly depend on magnetic field amplitude. Unlike most ACS measurements, which are typically performed using low magnetic field amplitude, MPI, hyperthermia, and MRI, are typically performed at fields ≥5 mT. Measurements by other have attained a rise time of ≈18 ns at ≈0.5 mT field amplitude. As a demonstration of the magnetic field amplitude dependence, we have made relaxometry measurements of 15 nm MNPs with pulsed magnetic fields over the range of 0.5-5 mT [FIG. 18]. Here, the data clearly show a two-step mechanism, corresponding to two distinct dynamics at timescales $\tau_1$ and $\tau_2$, a direct correlation with the ACS data. The two separate dynamics are more distinct at higher amplitudes. Both timescales are too fast for Brownian relaxation and, therefore, are attributed to two distinct Néel processes from the mixed magnetic populations present in our sample. FIG. 19 shows that the time constant for the $\tau_1$ process decreases by a factor of 3-4 when the field amplitude is increased by a factor of 10. The less dominant $\tau_2$ process displays larger uncertainties, and the time constant decreases by a factor of two within the measurement range. The zero-field relaxation was also measured at the falling edge of the pulse, and a time constant of (78±16) ns was observed.

This work shows that iron oxide systems that appear to have narrow polydispersity from TEM can display complex magnetic properties and dynamics. From fundamental characterization of nanoparticles with limited interactions, this work reveals the mechanisms of relaxation, as well as the identification of mixed magnetic populations from dynamics information. With increased concentration in practical settings, stronger interparticle interaction will alter energy barriers, broaden distributions, and modify the overall magnetic response. Typical operation of embodiments of the present invention as shown in the preceding examples can be applied to pulsed magnetic fields at amplitudes near 20 mT for manipulating Brownian, Néel, and superferromagnetic timescales for magnetic imaging, thermometry, and hyperthermia. Typical operation of embodiments of the present invention as shown in the preceding examples can also be applied to broadly tune thermal energy (temperature), measurement time (frequency/time), energy barrier height (field amplitude), and when combined with modification of particle anisotropy (size, shape, and composition), can assist in MNP optimization for applications in MPI, hyperthermia, and MRI.

Systems and methods for measurement of magnetic nanoparticle samples in accordance with one or more embodiments of the present invention can be adapted to a variety of configurations. It is thought that systems and methods for magnetic measurement of magnetic nanoparticle sample in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. An apparatus for measuring a magnetic nanoparticle sample, comprising:
   a sample stage for receiving a magnetic nanoparticle sample, wherein the sample stage comprises an outer sample stage assembly encasing an inner sample stage assembly, wherein the inner sample stage assembly comprises a first sensor region and a second sensor region separated by a predetermined distance, wherein the first sensor region comprises a cavity for receiving a sample holder containing the magnetic nanoparticle sample;
   a heat transfer unit coupled to the sample stage for heating the magnetic nanoparticle sample to a predetermined temperature, wherein the heat transfer unit is coupled to a conduit positioned on the sample stage for transporting a heat transfer fluid through the sample stage;
   a plurality of temperature sensors positioned on the sample stage for monitoring the temperature of the magnetic nanoparticle sample;
   an electrical power source configured to generate a high-frequency alternating current;
   a drive coil coupled to the electrical power source to generate a magnetic field for application to the magnetic nanoparticle sample, wherein the drive coil is wound around the outer sample stage assembly to encase the first sensor region and the second sensor region, wherein an inductance of the drive coil is set to a predetermined inductance value such that the drive coil is capable of receiving the high-frequency alternating current;
   a sample sensor positioned at the first sensor region to detect a magnetic response of the magnetic nanoparticle sample, wherein the magnetic response comprises an induced voltage generated in response to the magnetic field applied by the drive coil and the temperature of the magnetic nanoparticle sample;
   a magnetic field sensor positioned at the second sensor region to detect the magnetic field generated by the drive coil;
   a receive circuit for receiving the induced voltage generated in response to the magnetic field applied by the drive coil and the temperature of the magnetic nanoparticle sample and generating an amplified and filtered induced voltage data;
   a digitizer for digitizing the amplified and filtered induced voltage data; and
   a processor for processing the digitized data to determine AC susceptibility and magnetic relaxometry signals of the magnetic nanoparticle sample and to determine intrinsic properties of the magnetic nanoparticles from the magnetic response.

2. The apparatus of claim 1, wherein the drive coil is a solenoid coil.

3. The apparatus of claim 1, wherein the sample sensor comprises a first inductive coil wound around the first sensor region, and wherein the magnetic field sensor comprises a second inductive coil wound around the second sensor region.

4. The apparatus of claim 1, wherein the magnetic field sensor and the sample sensor are separated by about 10 mm.

5. The apparatus of claim 1, wherein the inductance of the drive coil is about 1 µH and the resistance of the drive coil is about 1 ohm.

6. The apparatus of claim 1, wherein the first and second inductive coils are wound around the inner sample stage assembly as a first order gradiometer.

7. The apparatus of claim 1, wherein the electrical power source is a high voltage power supply coupled to a capacitor circuit, a waveform generator, high voltage switch and a high voltage power supply to generate the high-frequency alternating current having a pulsed waveform, wherein the alternating current has a pulse rise time of about 20 ns.

8. The apparatus of claim 1, wherein the electrical power source is a waveform generator coupled to a high-frequency current amplifier to generate a high-frequency alternating current having an arbitrary waveform, wherein the alternating current has plurality of sinusoidal components having a frequency from about 1 kHz to about 50 MHz.

9. The apparatus of claim 1, further comprising a controller comprising:
   a digital lock-in amplifier to measure a first amplitude and a first phase of a first and third harmonic of the magnetic field detected by magnetic field sensor,
   a feedback loop filter for applying the first amplitude of the first harmonic to stabilize the magnetic field generated by the drive coil to a predetermined value, and
   a feedforward lock for subtracting the first and the third harmonic of the magnetic field detected by magnetic field sensor from the magnetic response detected by the sample sensor.

10. The apparatus of claim 9, wherein the feedforward lock for subtracting the first and the third harmonic of the magnetic field detected by the magnetic field sensor from the magnetic response detected by the sample sensor comprises:
   a drive field stabilization feedback lock for comparing the first amplitude of the first harmonic of the magnetic field detected by the magnetic field sensor to a first set point value to generate an error signal;
   a first function generator for applying the error signal to the first amplitude of the first harmonic to stabilize the first harmonic amplitude to a second set point value;
   a processor for determining a correction signal from the first amplitude and the first phase of the first and the third harmonic of the magnetic field detected by the magnetic field sensor;
   a second function generator for generating a second amplitude and a second phase for the first and the third harmonic of the magnetic field detected by the magnetic field sensor, wherein the second amplitude and the second phase are determined from the correction signal determined by the processor;

a summer to combine the second amplitude and the second phase for the first and the third harmonic of the magnetic field detected by the magnetic field sensor;
a preamplifier for receiving a first signal comprising the combined second amplitude and the second phase for the first and the third harmonic of the magnetic field detected by the magnetic field sensor and a second signal comprising the magnetic response detected by the sample sensor, wherein the preamplifier receives the first signal in a first channel and the second signal in a second channel, wherein the preamplifier generates a differential output of the first and second signals, wherein the generating the differential output comprises subtracting the first and the third harmonic of the magnetic field detected by the magnetic field sensor from the magnetic response detected by the sample sensor; and
a digitizer for digitizing the differential output generated by the preamplifier.

11. The apparatus of claim 1, wherein the sample stage is non-magnetic, and wherein the sample stage has a thermal conductivity above a predetermined value.

12. The apparatus of claim 1, wherein the sample stage is fabricated using aluminum nitride/boron nitride.

13. The apparatus of claim 1, wherein each of the plurality of the temperature sensors is a resistance thermometer.

14. An apparatus for measuring a magnetic nanoparticle sample, comprising:
a sample stage for receiving the magnetic nanoparticle sample, wherein the sample stage comprises an outer sample stage assembly encasing an inner sample stage assembly, wherein the inner sample stage assembly comprises a first sensor region and a second sensor region separated by a predetermined distance, wherein the first sensor region comprises a cavity for receiving a sample holder containing the magnetic nanoparticle sample;
a heat transfer unit coupled to the sample stage for heating the magnetic nanoparticle sample to a predetermined temperature, wherein the heat transfer unit is coupled to a conduit positioned on the sample stage for transporting a heat transfer fluid through the sample stage;
a plurality of temperature sensors positioned on the sample stage for monitoring the temperature of the first sensor region;
an electrical power source configured to generate a high-frequency alternating current having a pulsed waveform;
a drive coil coupled to the electrical power source to generate a magnetic field for application to the magnetic nanoparticle sample, wherein the drive coil is wound around the outer sample stage assembly in a region encasing the first sensor region and the second sensor region, wherein an inductance and resistance of the drive coil is set to predetermined values such that the drive coil is capable of receiving the high-frequency alternating current;
a first inductive coil positioned at the first sensor region to detect a magnetization change to the magnetic nanoparticle sample based on the magnetic field applied by the drive coil and the temperature of the magnetic nanoparticle sample, wherein the magnetization change to the magnetic nanoparticle comprises an induced voltage generated in response to the magnetic field applied by the drive coil and the temperature of the magnetic nanoparticle sample;
a second inductive coil positioned at the second sensor region to detect the magnetic field generated by the drive coil;
a receive circuit for receiving the induced voltage generated in response to the magnetic field applied by the drive coil and the temperature of the magnetic nanoparticle sample and generating an amplified and filtered induced voltage data;
a digitizer for digitizing the amplified and filtered induced voltage data; and
a processor for processing the digitized data to determine AC susceptibility and magnetic relaxometry signals of the magnetic nanoparticle sample and to determine intrinsic properties of the magnetic nanoparticles from the magnetic response.

15. The apparatus of claim 14, wherein the electrical power source is configured to generate a high-frequency alternating current having a pulse rise time of about 20 ns.

16. The apparatus of claim 14, wherein the first and the second induction coils are separated by about 10 mm.

17. The apparatus of claim 14, wherein the inductance of the drive coil is about 1 µH and the resistance of the drive coil is about 1 ohm.

18. An apparatus for measuring a magnetic nanoparticle sample, comprising:
an inner sample stage assembly for receiving the magnetic nanoparticle sample, wherein the inner sample stage assembly comprises a first sensor region and a second sensor region separated by a predetermined distance, wherein the first sensor region comprises a cavity for receiving a sample holder containing the magnetic nanoparticle sample;
an outer sample stage assembly encasing the first and second sensor regions of the inner sample stage assembly;
a heat transfer unit coupled to the inner sample stage assembly for heating the magnetic nanoparticle sample at a predetermined temperature, wherein the heat transfer unit is coupled to a conduit positioned on the sample stage for transporting a heat transfer fluid through the sample stage;
a plurality of temperature sensors positioned on the inner sample stage assembly for monitoring the temperature of the first sensor region;
an electrical power source configured to generate a high-frequency alternating current;
a drive coil coupled to the electrical source to generate a magnetic field for application to a magnetic nanoparticle sample, wherein the drive coil is wound around the drive coil region of the outer sample stage assembly, wherein an inductance and resistance of the drive coil is set to predetermined values such that the drive coil is capable of receiving the high-frequency alternating current;
a sample sensor for detecting a magnetic response of the magnetic nanoparticle sample comprising a first inductive coil wound around the first sensor region of the inner sample stage assembly, wherein the magnetic response comprises an induced voltage generated in response to the magnetic field and the temperature of the magnetic nanoparticle sample;
a magnetic field for detecting the magnetic field generated by the drive coil, wherein the magenetic field sensor comprises a second inductive coil wound around the second sensor region of the inner sample stage assembly;

a receive circuit for receiving the induced voltage generated in response to the magnetic field applied by the drive coil and the temperature of the magnetic nanoparticle sample and generating an amplified and filtered induced voltage data;

a controller comprising:

a digital lock-in amplifier to measure a first amplitude and a first phase of a first and third harmonic of the magnetic field detected by magnetic field sensor, a feedback loop filter for applying the first amplitude of the first harmonic to stabilize the magnetic field generated by the drive coil to a predetermined value, and a feedforward lock for subtracting the first and the third harmonic of the magnetic field detected by magnetic field sensor from the magnetic response detected by the sample sensor;

a digitizer for digitizing the amplified and filtered differential output generated by the preamplifier; and a processor for processing the digitized data to determine AC susceptibility and magnetic relaxometry signals of the magnetic nanoparticle sample and to determine intrinsic properties of the magnetic nanoparticles from the magnetic response.

19. The apparatus of claim 18, wherein the electrical power source is configured to generate the high-frequency alternating current having a pulsed waveform or an arbitrary waveform.

20. The apparatus of claim 18, wherein the inductance of the drive coil is about 1 µH and the resistance of the drive coil is about 1 ohm, and wherein the first and the second induction coils are separated by about 10 mm.

* * * * *